(12) United States Patent
Sugai et al.

(10) Patent No.: US 7,904,677 B2
(45) Date of Patent: Mar. 8, 2011

(54) MEMORY CONTROL DEVICE

(75) Inventors: Hidenori Sugai, Kawasaki (JP); Hiroshi Tomonaga, Kawasaki (JP); Satoshi Nemoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 367 days.

(21) Appl. No.: 12/230,252

(22) Filed: Aug. 26, 2008

(65) Prior Publication Data

US 2009/0172318 A1 Jul. 2, 2009

(30) Foreign Application Priority Data

Dec. 27, 2007 (JP) ................. 2007-335671

(51) Int. Cl.
*G06F 12/00* (2006.01)
(52) U.S. Cl. ......... 711/159; 711/154; 711/156; 711/202; 711/221
(58) Field of Classification Search .................. 711/159, 711/154, 156, 202, 221
See application file for complete search history.

(56) References Cited

U.S. PATENT DOCUMENTS

| 5,978,875 | A | 11/1999 | Asano et al. |
| 6,067,632 | A | 5/2000 | Yamaguchi |
| 6,671,289 | B1 * | 12/2003 | Tamura et al. ................ 370/474 |
| 7,295,553 | B2 | 11/2007 | Saitoh |
| 7,606,249 | B1 * | 10/2009 | Swenson ....................... 370/412 |

* cited by examiner

*Primary Examiner* — Stephen C Elmore
(74) *Attorney, Agent, or Firm* — Staas & Halsey LLP

(57) ABSTRACT

A memory control device that can improve the speed of a memory interface. A packet disassembly section disassembles packet data into segments and detects packet quality information. A memory management section has an address management table and manages a state in which the packet data is stored according to the packet quality information. A segment/request information disassembler disassembles the segments into data by an access unit by which memories can be written/read, and generates write requests and read requests according to the access unit. A memory access controller avoids a bank access to which is prohibited because of a bank constraint, extracts a write request or a read request corresponding to an accessible bank from the write requests or the read requests generated, and gains write/read access to the memories.

7 Claims, 19 Drawing Sheets

| DISASSEMBLY INFORMATION | | |
|---|---|---|
| ReqID | LEADING SN | DISASSEMBLY NUMBER |
| 1 | n | 4 |
| 2 | n+4 | 2 |

D1: row 1
D2: row 2

FIG. 14

MEMORY CONTROL DEVICE

CROSS-REFERENCE TO RELATED APPLICATIONS

This application is based upon and claims the benefits of priority from the prior Japanese Patent Application No. 2007-335671, filed on Dec. 27, 2007, the entire contents of which are incorporated herein by reference.

BACKGROUND (1) Field

This invention relates to a memory control device and, more particularly, to a memory control device that controls access to a memory having a plurality of banks in a storage area.

(2) Description of the Related Art

In recent years communication networks have made great strides with the rapid spread of the Internet. In particular, data communication represented by internet protocol (IP) packet communication is becoming the mainstream of traffic on all networks. In addition, device capacity, for example, has become conspicuously large because of a rise in demand for communication services or an increase in communication speed.

A router and a switch for performing packet transfer are located on such a communication network. They are used to exercise quality of service (QoS) control for transferring a packet, while ensuring packet communication quality.

With QoS control, control is exercised for outputting packets in order that is different from the order in which they arrive on the basis of quality information each packet has. Accordingly, it is necessary to locate a packet buffer as a memory for storing packet data until the outputting of the packets.

As a result, a large capacity packet buffer and high-speed access to the packet buffer are essential to data communication in which large capacity and high speed are needed. A packet buffer must efficiently be used.

Usually a dynamic random access memory (DRAM) is used as a packet buffer. A DRAM has a plurality of blocks which are called banks and in which memory cells can operate independently (typical DRAM is a synchronous DRAM (SDRAM) which is synchronized with a clock and which generally has 4 banks). Each bank is separated by a row address and a column address.

A DRAM has a simple structure (inexpensive) and a large capacity memory chip can be mounted on one device. As a result, DRAMs are widely used as packet buffers, main memories in computers, and the like.

To control access to a DRAM, a packet is disassembled into areas called segments, a write command or a read command is generated by the segment, and packet data is written/read out.

When the same bank is accessed or write/read is switched, wait time (wait) is required. Therefore, a temporal restriction is put on access.

FIG. 16 is a view showing a time chart of a DRAM interface. It is assumed that a DRAM has 4 banks b1 through b4. The interface shown in FIG. 16 is used for serially accessing each bank.

In an interval T1, data is written once to each of the banks b1 through b4, that is to say, the cycle of write access to the banks b1 through b4 is performed. In an interval T2, data is read out once from each of the banks b1 through b4, that is to say, the cycle of read access to the banks b1 through b4 is performed.

A minimum access unit shown in FIG. 16 indicates minimum access time during which one bank is accessed and corresponds to the length of data written to a bank by one access or the length of data read out from a bank by one access. In the example shown in FIG. 16, written data d1 through d4 or read data d11 through d14 corresponds to one segment.

[C1] The data d1 is written to the bank b1 by a write command w1.

[S1a] The writing of the data d1 to the bank b1 is begun in the cycle C1. After that, write access to the bank b1 cannot be gained from cycles C2 through C4. That is to say, a bank constraint is imposed (that is to say, time during which the bank b1 cannot be accessed exists). The bank b1 can be accessed next in or after a cycle C5.

[C3] The data d2 is written to the bank b2 by a write command w2.

[S2a] The writing of the data d2 to the bank b2 is begun in the cycle C3. After that, write access to the bank b2 cannot be gained from cycles C4 through C6. That is to say, a bank constraint is imposed. The bank b2 can be accessed next in or after a cycle C7 (write access is then performed in the order of the banks b3 and b4 and the same bank constraint is imposed on each of the banks b3 and b4).

[C11] The data d11 is read out from the bank b1 by a read command r1.

[S3a] The reading of the data d11 from the bank b1 is begun in the cycle C11. After that, read access to the bank b1 cannot be gained from cycles C12 through C14. That is to say, a bank constraint is imposed. The bank b1 can be accessed next in or after a cycle C15.

[C13] The data d12 is read out from the bank b2 by a read command r2.

[S4a] The reading of the data d12 from the bank b2 is begun in the cycle C13. After that, read access to the bank b2 cannot be gained from cycles C14 through C16. That is to say, a bank constraint is imposed. The bank b2 can be accessed next in or after a cycle C17 (read access is then performed in the same way in the order of the banks b3 and b4 and a bank constraint is imposed on each of the banks b3 and b4).

[S5a] When switching from write access to read access is performed, a write/read switching constraint is imposed (when switching from write access to read access or switching from read access to write access is performed, time during which an applicable bank cannot be accessed exists).

FIG. 17 is a view showing a time chart of a DRAM interface. It is assumed that there are 4 DRAMs #1 through #4. The interface shown in FIG. 17 is used for accessing a bank of each DRAM in parallel. Write access is performed in an interval T1a and read access is performed in an interval T2a.

[C1] Data d1, d2, d3, and d4 are written to arbitrary banks of the DRAMs #1 through #4, respectively, by a write command w1.

[S1b] When the writing of the data d1 through d4 to the DRAMs #1 through #4, respectively, is begun in the cycle C1, a bank constraint is imposed.

[C5] Data d5, d6, d7, and d8 are written to arbitrary banks of the DRAMs #1 through #4, respectively, by a write command w2. To write the data d5 through d8 to arbitrary banks, this writing is begun in a cycle C5. The bank constraint imposed because of the writing in the cycle C1 is removed before the cycle C5, so access to the same banks that are accessed in the last writing can also be gained.

[S2b] When the writing of the data d5 through d8 to the DRAMs #1 through #4, respectively, is begun in the cycle C5, a bank constraint is imposed.

[C11] Data d11, d12, d13, and d14 are read out from corresponding banks of the DRAMs #1 through #4, respectively, by a read command r1.

[S3b] When the reading out of the data d11 through d14 from the DRAMs #1 through #4, respectively, is begun in the cycle C11, a bank constraint is imposed.

[C15] Data d15, d16, d17, and d18 are read out from corresponding banks of the DRAMs #1 through #4, respectively, by a read command r2. In this case, reading is begun in a cycle C15. The bank constraint imposed because of the reading in the cycle C11 is removed before the cycle C15, so access to the same banks that are accessed in the last reading can also be gained.

[S4b] When the reading out of the data d15 through d18 from the DRAMs #1 through #4, respectively, is begun in the cycle C15, a bank constraint is imposed.

[S5b] A write/read switching constraint is imposed because switching from write access to read access is performed.

In the past, a technique for reading out data to be included in a sent packet and writing data included in a received packet in parallel has been proposed as a memory access technique (see Japanese Patent Laid-Open Publication No. 2002-344502, Paragraph Nos. [0033] and [0034] and FIG. 1).

As stated above, access to a DRAM is controlled in the following way. After one bank is accessed, wait time is required to access the bank again. Accordingly, the following method, for example, is used for disassembling a packet into segments. With a serial interface for accessing 4 banks, banks b1, b2, b3, and b4 are accessed in that order and the cycle of access to the banks b1 through b4 is then performed again in the same way. A packet is disassembled into segments on the basis of the amount of data written by the cycle of write accesses to the banks b1 through b4 or the amount of data read out by the cycle of read accesses to the banks b1 through b4. If a packet is disassembled on the basis of the amount of data written or read out by the cycle of access to banks, then one segment=(access unit)×(number of banks).

FIG. 18 is a view showing the structure of a packet. It is assumed that a DRAM has 4 banks. Packet data p1a consists of segments s1a and s2a. The segment s1a consists of data d1 through d4. The segment s2a consists of data d5 through d8. If each piece of data is equal to an access unit, then each of the segments s1a and s2a satisfies (one segment=access unit× number of banks).

Packet data p2a consists of segments s11a and s12a. The segment s11a consists of data d1 through d4. The segment s12a consists of only data d5. With the packet data p2a, only the segment s11a satisfies (one segment=access unit×number of banks).

With the conventional DRAM access control shown in FIG. 16 or 17, the rate of transfer to a DRAM does not decrease if a packet which, like the packet data p1a, consists of only segments each of which satisfies (one segment=access unit×number of banks) is handled.

However, if a packet which, like the packet data p2a, includes a segment (segment s11a) that satisfies (one segment=access unit×number of banks) and a segment (segment s12a) that does not satisfy (one segment=access unit× number of banks) is handled, the rate of transfer to a DRAM decreases.

FIG. 19 is a view for describing the reason for a decrease in transfer rate.

[C1, C3, C5, and C7] To write the segment s11a, the data d1, d2, d3, and d4 is written to the banks b1, b2, b3, and b4 by write commands w1, w2, w3, and w4 respectively. When each writing process is begun, a bank constraint is imposed.

[C9] To write the segment s12a, the data d5 is written to the bank b1 by a write command w5.

[C11, C13, and C15] Write access is performed by the segment, so write commands for gaining write access to the banks b2 through b4 are also generated in cycles C11, C13, and C15 respectively. Actually, however, data to be written does not exist, so these cycles are idle cycles.

If a packet in which packet data cannot be divided by (access unit×number of banks) without a remainder is written/read out in this way by the segment, then an idle cycle (useless empty access) occurs and a transfer rate decreases.

It is assumed that a clock rate of an interface used for accessing one DRAM is S and that the rates of writing and reading by a data bus are N (N is proportional to S). If the packet data p2a shown in FIG. 18 is written or read out continuously, then a transfer rate decreases to N×5/8. That is to say, a transfer rate can be increased only to N×5/8 (as can be seen from FIG. 19, the number of pieces of data included in the packet data p2a is 8 and the number of pieces of data which can continuously be written or read out without the occurrence of an idle cycle is 5). If the packet data p2a is the worst case from the viewpoint of performance and N is an effective data rate guaranteed for the device, then the clock rate must be increased to S×8/5.

For example, it is assumed that an effective data rate to be guaranteed for a memory interface is 10 Gbps (data rates to be guaranteed for writing and reading are 10 Gbps), that 5 data buses are used for one DRAM, and that a clock rate of one data bus is 200 Mbps (=S).

In this case, access to one DRAM can be gained at the data rate of 1 Gbps (=200 Mbps×5). If a calculation is performed simply, then 10 DRAMs are required. Actually, however, writing to and reading from one DRAM cannot be performed at the same time. Accordingly, write access and read access to one DRAM are gained at the data rate of 500 Mbps (500 Mbps=N). In this case, 20 DRAMs are required in order to guarantee a writing data rate of 10 Gbps and a reading data rate of 10 Gbps (10 Gbps (guaranteed writing data rate)=500 Mbps×20 and 10 Gbps (guaranteed reading data rate)=500 Mbps×20).

If the packet data p2a shown in FIG. 18 is written or read out continuously in such a state of the memory interface, actual access is gained in the 5 cycles of the 8 cycles. A writing/reading data rate to be guaranteed is 500 Mbps, but in reality a writing/reading data rate is at most 500×5/8 Mbps.

Access is substantially gained at the low clock rate of 200×5/8 Mbps from the viewpoint of a clock rate of a data bus. Accordingly, to realize the target data rate of 10 Gbps with the idle cycles taken into consideration, the clock rate must be increased to 200×8/5 (=320 Mbps) (above numeric values are not realistic and are merely set for the sake of simplicity).

With the conventional DRAM access control described in FIG. 17, on the other hand, one segment=(access unit)×(number of DRAMs). If the packet data p2a shown in FIG. 18 is written or read out, the number of DRAMs increases.

It is assumed that an effective data rate guaranteed for a device is R and that the rates of writing to and reading from a DRAM by the use of a data bus are Q (Q is proportional to R). If the packet data p2a is written or read out continuously, then a transfer rate decreases to Q×5/8. Therefore, the number of DRAMs must be increased to R/(Q×5/8).

For example, it is assumed that an effective data rate to be guaranteed for a memory interface is 10 Gbps (data rates to be guaranteed for writing and reading out are 10 Gbps (=R)), that 5 data buses are used for one DRAM, and that a clock rate of one data bus is 200 Mbps.

In this case, write access and read access to one DRAM are gained at the data rate of 500 Mbps (500 Mbps=Q). Accordingly, 20 (=10 Gbps/500 Mbps) DRAMs are required in order to guarantee a writing data rate of 10 Gbps and a reading data rate of 10 Gbps.

If the packet data p2a is written or read out continuously in such a state of the memory interface, actual access is gained only in the 5 cycles of the 8 cycles. A writing/reading data rate to be guaranteed is 500 Mbps, but in reality a writing/reading data rate is at most 500×⅝ Mbps.

Therefore, to realize a target data rate of 10 Gbps, the number of DRAMs must be increased to 32 (=10 Gbps/(500×(⅝) Mbps) (above numeric values are not realistic and are merely set for the sake of simplicity).

As has been described in the foregoing, with the conventional DRAM access control a clock rate or the number of DRAMs must be determined with the occurrence of useless empty access taken into consideration in order to guarantee an effective data rate (descriptions of a write/read switching constraint are omitted in the foregoing, but a clock rate or the number of DRAMs is determined with idle cycles caused by a write/read switching constraint taken into consideration in the case of actually designing a memory interface).

However, there is a limit to a clock rate, so a clock rate required to guarantee an effective data rate cannot always be set. In addition, an increase in the number of DRAMs raises the costs and has an influence on the realization of the entire device. For example, the number of inputs-outputs of the device is limited, the area of a package for mounting shrinks, or wiring over a package becomes difficult. As a result, it is impossible to properly improve the speed of a memory interface.

SUMMARY

The present invention was made under the background circumstances described above. An object of the present invention is to provide a memory control device that improves efficiency in writing/reading, that reduces the number of memories, and that improves the speed of a memory interface.

In order to achieve the above object, according to one aspect of the embodiment, a memory control device for controlling access to a memory having a plurality of banks in a storage area. This memory control device comprises a packet disassembly section for disassembling received packet data into segments and detecting packet quality information, a memory management section having an address management table for managing an address of a storage destination of the plurality of banks, the memory management section being used for managing a state in which the packet data is stored according to the packet quality information, and a memory control section including a segment/request information disassembler for disassembling the segments into data by an access unit by which the memory can be written/read and for generating write requests or read requests according to the access unit and a memory access controller for exercising memory access control to write the data to the plurality of banks in response to the write requests or to read out the data from the plurality of banks in response to the read requests, the memory access controller avoiding banks access to which is prohibited because of bank constraints, extracting write requests or read requests corresponding to accessible banks from the write requests or the read requests generated, and gaining write/read access to the memory.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 14 is a view showing disassembly information.

DESCRIPTION OF THE PREFERRED EMBODIMENTS

Figure 1:
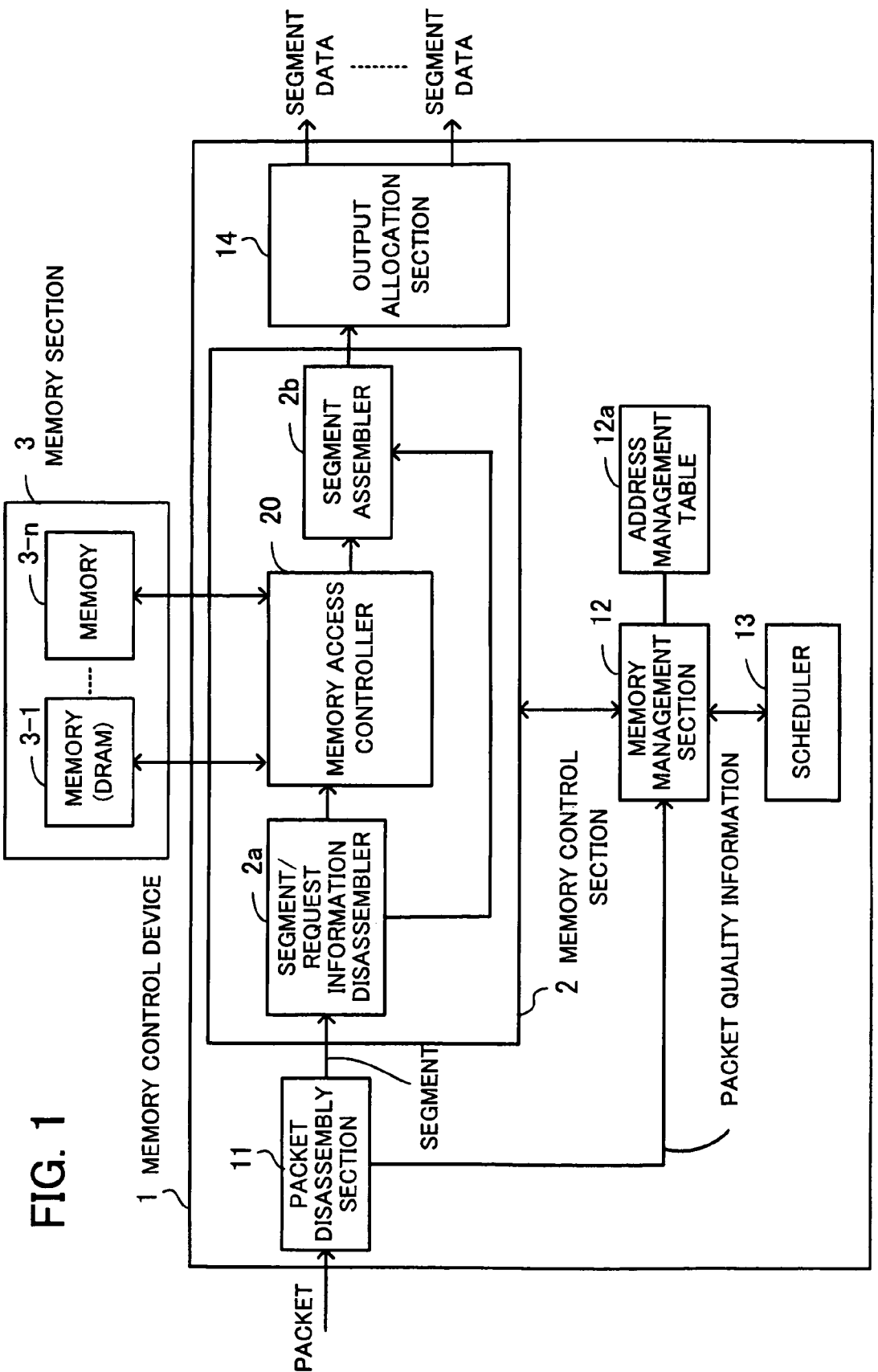
FIG. 1 is a view for describing the principles underlying a memory control device according to the present invention.

Embodiments of the present invention will now be described with reference to the drawings. FIG. 1 is a view for describing the principles underlying a memory control device according to the present invention. A memory control device 1 comprises a packet disassembly section 11, a memory management section 12, a scheduler 13, an output allocation section 14, and a memory control section 2. In addition, a memory section 3 (corresponding to a packet buffer) including memories (DRAMs) 3-1 through 3-n is connected to the memory control device 1.

The packet disassembly section 11 disassembles received packet data into segments (also referred to as segment data) and detects packet quality information. The memory management section 12 has an address management table 12a for managing an address of a storage destination of a bank and manages a state in which the packet data is stored according to the packet quality information.

The memory control section 2 includes a segment/request information disassembler 2a, a memory access controller 20, and a segment assembler 2b. The segment/request information disassembler 2a disassembles the segments into data by an access unit by which the memories 3-1 through 3-n can be written/read, and generates write requests and read requests according to the access unit. The memory access controller 20 exercises memory access control for writing data to a bank in response to a write request and reading out data from a bank in response to a read request.

The scheduler 13 determines order in which data is read out on the basis of the packet quality information about which the scheduler 13 is informed via the memory management section 12, and sends the order to the memory management section 12. The output allocation section 14 sends segment data reassembled by the segment assembler 2b to a predetermined processing section at a next stage.

The memory access controller 20 avoids a bank access to which is prohibited because of a bank constraint, extracts a write request or a read request corresponding to an accessible bank from the write requests or the read requests generated, and gains write/read access to the memories 3-1 through 3-n.

Figure 2:
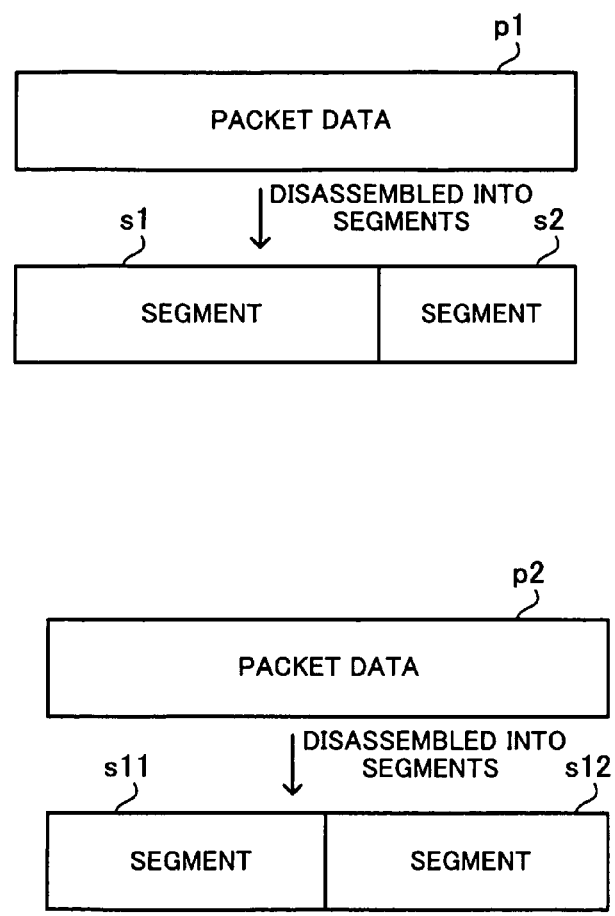
FIG. 2 is a view showing packet disassembly.

Each component will now be described in detail. The packet disassembly section 11 will be described first. FIG. 2 is a view showing packet disassembly. The packet disassembly section 11 disassembles packet data into blocks called segments and sends the blocks to the memory control section 2.

Packet data p1 is disassembled into segments s1 and s2 and packet data p2 is disassembled into segments s11 and s12. In addition, the packet disassembly section 11 recognizes packet quality information (QoS-ID, class information, and the like) included in a packet header and sends the packet quality information to the memory management section 12.

Figure 3:
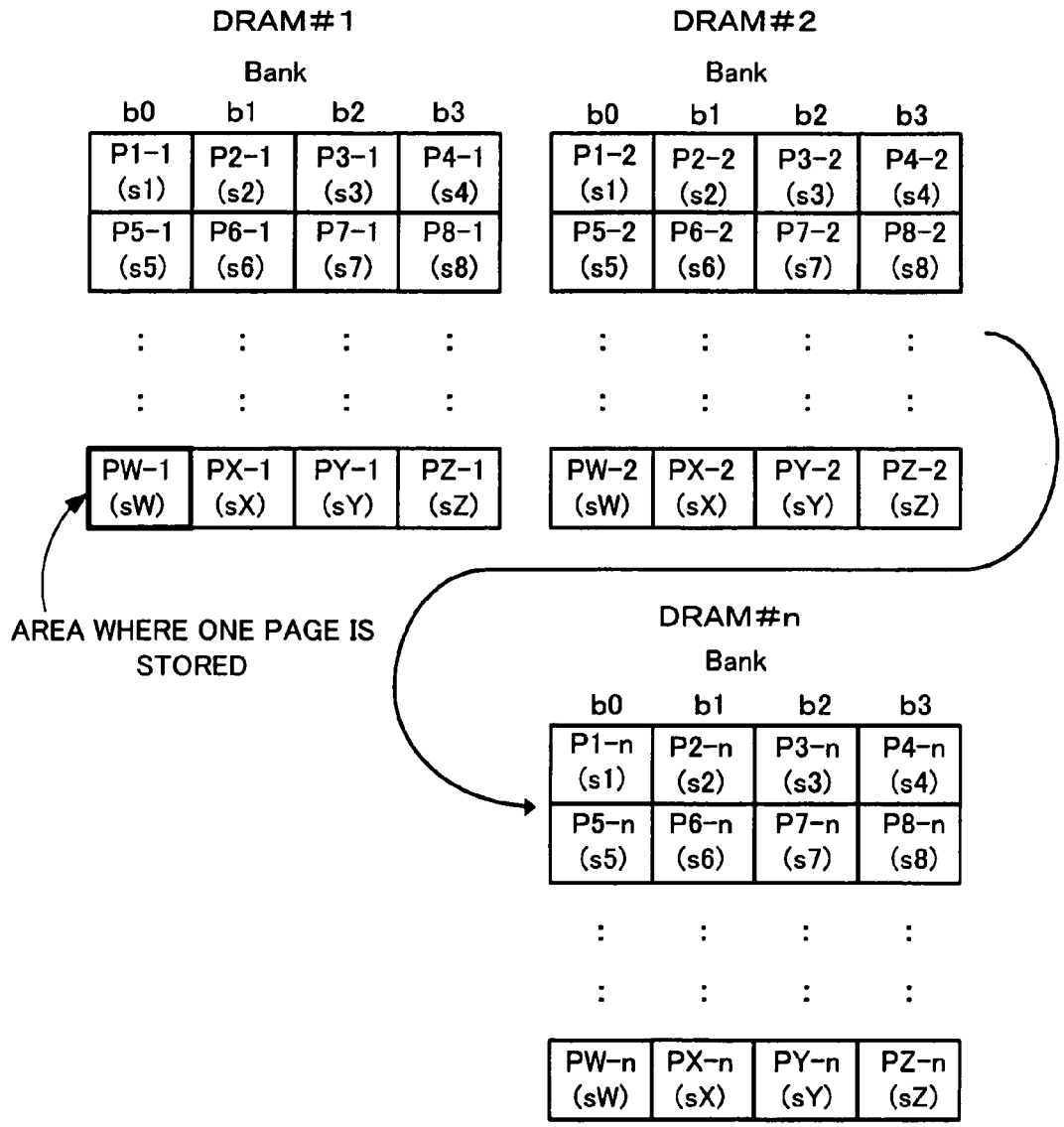
FIG. 3 is a view showing the structure of internal areas of memories.
Figure 4:
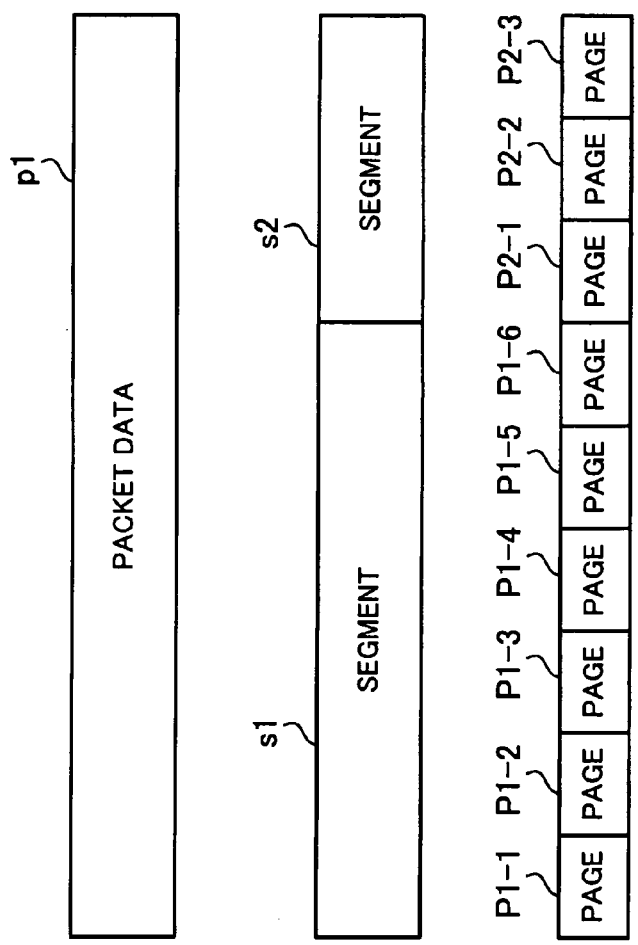
FIG. 4 is a view showing page areas of segments.

The memory section 3 and the memory management section 12 will now be described. FIG. 3 is a view showing the structure of internal areas of the memories 3-1 through 3-n. FIG. 4 is a view showing page areas of the segments. The memory section 3 includes DRAMs #1 through #n. The size of each DRAM is determined on the basis of the number of packets which may reside in the memory control device 1 with QoS performance taken into consideration.

Each DRAM has 4 banks b0 through b3. When packet data is stored, each segment is divided into page areas and is stored by the page. Storage results are managed by the memory management section 12.

Each of the smallest square frames shown in FIG. 3 is specified by a row address and a column address and indicates an area where data corresponding to one page is stored (data corresponding to one or more access units is stored).

A storage procedure is as follows. Data included in the same segment is stored by the page in banks having the same number of DRAMs having different numbers. Descriptions will be given with, for example, the packet data p1 shown in FIG. 4 as an example. The packet data p1 includes the segments s1 and s2. The segment s1 includes pages P1-1 through P1-6 and the segment s2 includes pages P2-1 through P2-3.

In FIG. 3, the pages P1-1 through P1-3 of the segment s1 of the packet data p1 are stored in an area P1-1($s1$) of a bank b0 of the DRAM #1, an area P1-2($s1$) of a bank b0 of the DRAM #2, and an area P1-3($s1$) of a bank b0 of the DRAM #3 respectively.

In addition, the pages P1-4 through P1-6 are stored in an area P1-4($s1$) of a bank b0 of the DRAM #4, an area P1-5($s1$) of a bank b0 of the DRAM #5, and an area P1-6($s1$) of a bank b0 of the DRAM #6 respectively. In this case, areas P1-7($s1$) through P1-n($s1$) of banks b0 of the DRAMs #7 through #n are empty.

The pages P2-1 through P2-3 of the segment s2 are stored in an area P2-1($s2$) of a bank b1 of the DRAM #1, an area P2-2($s2$) of a bank b1 of the DRAM #2, and an area P2-3($s2$) of a bank b1 of the DRAM #3 respectively. In this case, areas P2-4($s2$) through P2-n($s2$) of banks b1 of the DRAMs #4 through #n are empty.

Figure 5:
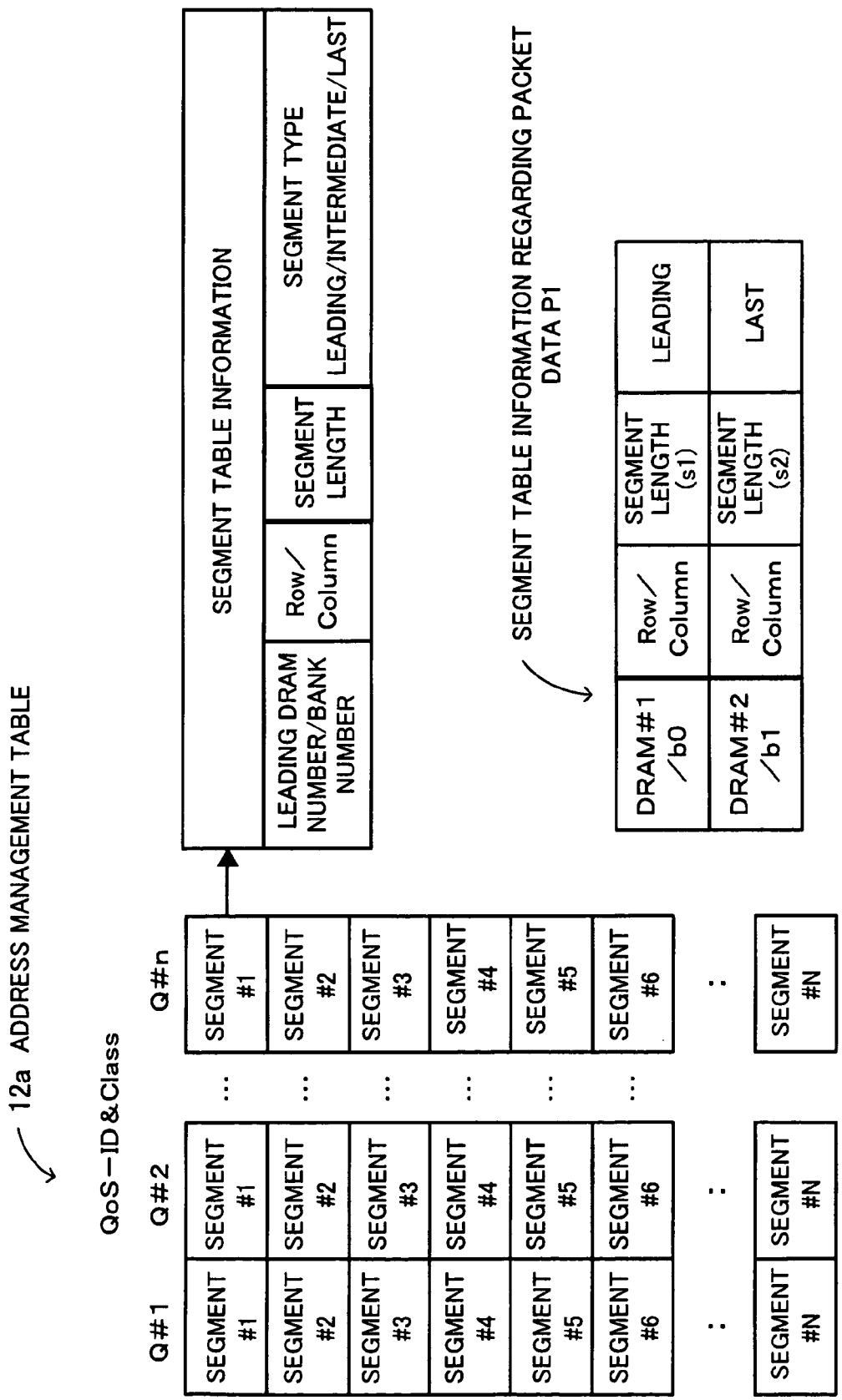
FIG. 5 is a view showing the structure of an address management table.

FIG. 5 is a view showing the structure of the address management table 12a. The memory management section 12 makes the address management table 12a for managing addresses of the memory section 3 where packet data is stored, and manages a state in which the packet data is stored in the memory section 3.

The address management table 12a consists of queues Q#1 through Q#n. If the packet quality information includes QoS-IDs and class units, the following correspondence, for example, exists. A queue a QoS-ID of which is aa and a class unit of which is c1 corresponds to the queue Q#1, a queue a QoS-ID of which is bb and a class unit of which is c2 corresponds to the queue Q#2, and so on. That is to say, the queues Q#1 through Q#n correspond to the packet quality information.

One queue stores segment table information (information that indicates how segment data is stored in the memory section 3) according to segment. For example, if the queue Q#2 corresponds to packet quality information regarding the packet data p1 shown in FIG. 2, then segment table information regarding the segment s1 of the packet data p1 and segment table information regarding the segment s2 of the packet data p1 are stored in order in segments #1 and #2, respectively, of the queue Q#2.

If the queue Q#1 corresponds to packet quality information regarding the packet data p2 shown in FIG. 2, then segment table information regarding the segment s11 of the packet data p2 and segment table information regarding the segment s12 of the packet data p2 are stored in order in segments #1 and #2, respectively, of the queue Q#1.

Segment table information includes Leading DRAM Number/Bank Number, Row/Column, Segment Length, and Segment Type (Leading/Intermediate/Last) items. The Leading DRAM Number/Bank Number item indicates the numbers of a leading DRAM and a bank in which a segment is stored (pages included in the segment are stored in banks of different DRAMs having the same number, and this number is indicated). The Row/Column item indicates a row address and a column address of an area indicated in the Leading DRAM Number/Bank Number item.

The Segment Length item indicates the data length of one segment. The Segment Type item indicates that a segment included in a packet is a leading segment, an intermediate segment, or a last segment.

The packet data p1, for example, is consists of the two segments s1 and s2. Accordingly, the segment s1 is a leading segment and the segment s2 is the last segment.

As described in FIG. 3, if the packet data p1 is stored in the memory section 3, (segment s1: leading DRAM number/bank number=DRAM #1/b0, corresponding row address/column address, segment length of segment s1, and leading segment) and (segment s2: leading DRAM number/bank number=DRAM #2/b1, corresponding row address/column address, segment length of segment s2, and last segment) are obtained as segment table information. These pieces of segment table information are stored in, for example, the segments #1 and #2, respectively, of the queue Q#1.

Figure 6:
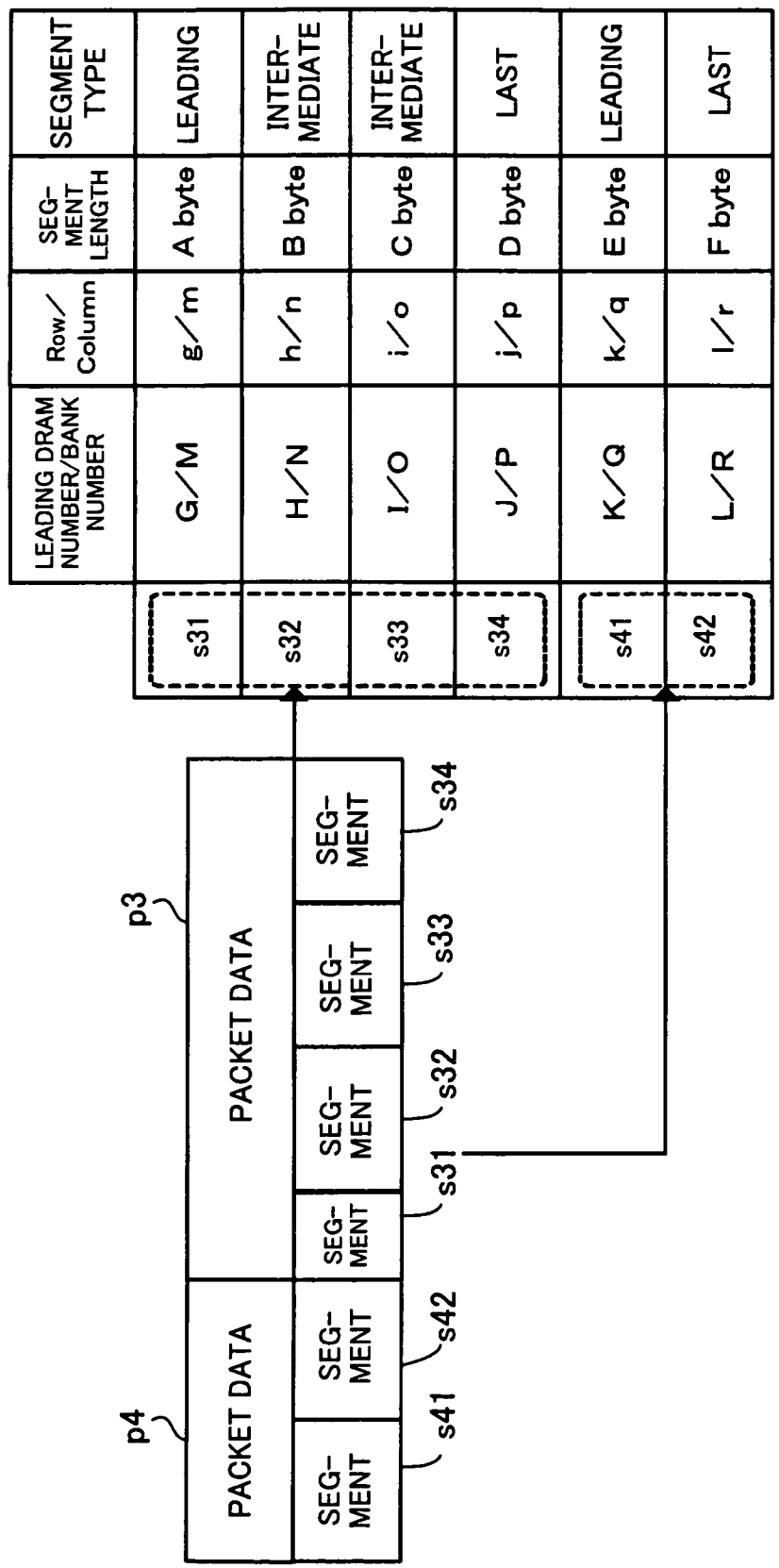
FIG. 6 is a view showing the operation of storage in the address management table.

FIG. 6 is a view showing the operation of storage in the address management table 12a. Packet data p3 consists of segments s31 through s34 and packet data p4 consists of segments s41 and s42. The packet data p3 and p4 includes the same packet quality information and segment table information shown in FIG. 6 is stored in the same queue.

Figure 7:
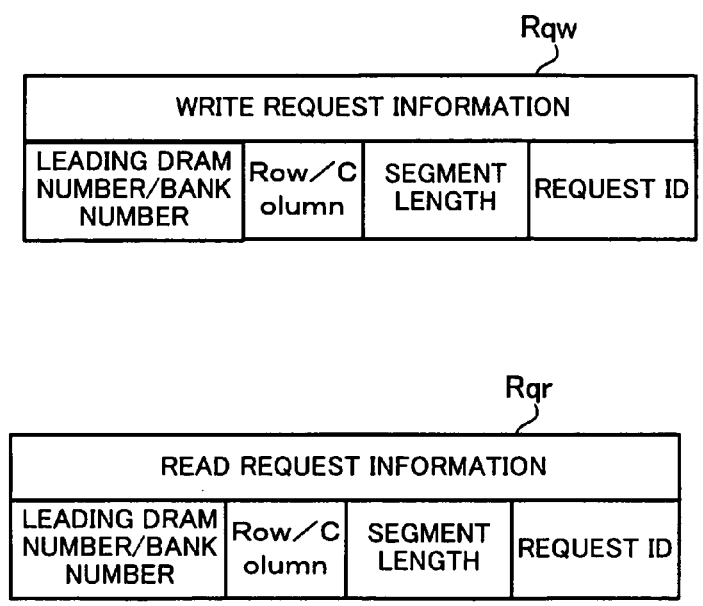
FIG. 7 is a view showing write/read request information.

FIG. 7 is a view showing write/read request information. Write request information Rqw is request information that indicates which area of the memory section 3 segment data is written to. Read request information Rqr is request information that indicates which area of the memory section 3 segment data is read out from. The write request information Rqw and the read request information Rqr include the same items.

When packet data is written to the memory section 3, the memory management section 12 generates write request information according to segment and sends the write request information to the memory control section 2. The write request information includes Leading DRAM Number/Bank Number, Row/Column, Segment Length, and Request ID items.

The numbers of a leading DRAM and a bank to which a segment is to be written are indicated in the Leading DRAM Number/Bank Number item. A row address and a column address of an area indicated in the Leading DRAM Number/Bank Number item are indicated in the Row/Column item. The segment length of the segment to be written is indicated in the Segment Length item. Sequential request IDs are given according to segment.

When packet data is read out from the memory section 3, the memory management section 12 generates read request information according to segment and sends the read request information to the memory control section 2. The read request information includes Leading DRAM Number/Bank Number, Row/Column, Segment Length, and Request ID items.

The numbers of a leading DRAM and a bank in which a segment to be read out is stored are indicated in the Leading DRAM Number/Bank Number item. A row address and a column address of an area indicated in the Leading DRAM Number/Bank Number item are indicated in the Row/Column item. The segment length of the segment to be read out is indicated in the Segment Length item. Sequential request IDs are given according to segment.

The following operation is performed before the memory management section 12 generates the read request information. The scheduler 13 first determines a queue to be read next, and sends a queue ID of the queue to the memory management section 12.

The memory management section 12 searches the address management table 12a by the use of the queue ID it receives, and extracts segment table information stored therein. The memory management section 12 then gives sequential request IDs to segments in the order of a leading segment to a last segment. By doing so, the memory management section 12 generates the read request information and sends the read request information to the memory control section 2.

The memory control section 2 will now be described. The memory control section 2 writes the segment data received from the packet disassembly section 11 to the memory section 3 on the basis of the write request information sent from the memory management section 12. In addition, the memory control section 2 reads segment data after scheduling from the memory section 3 on the basis of the read request information sent from the memory management section 12.

Figure 8:
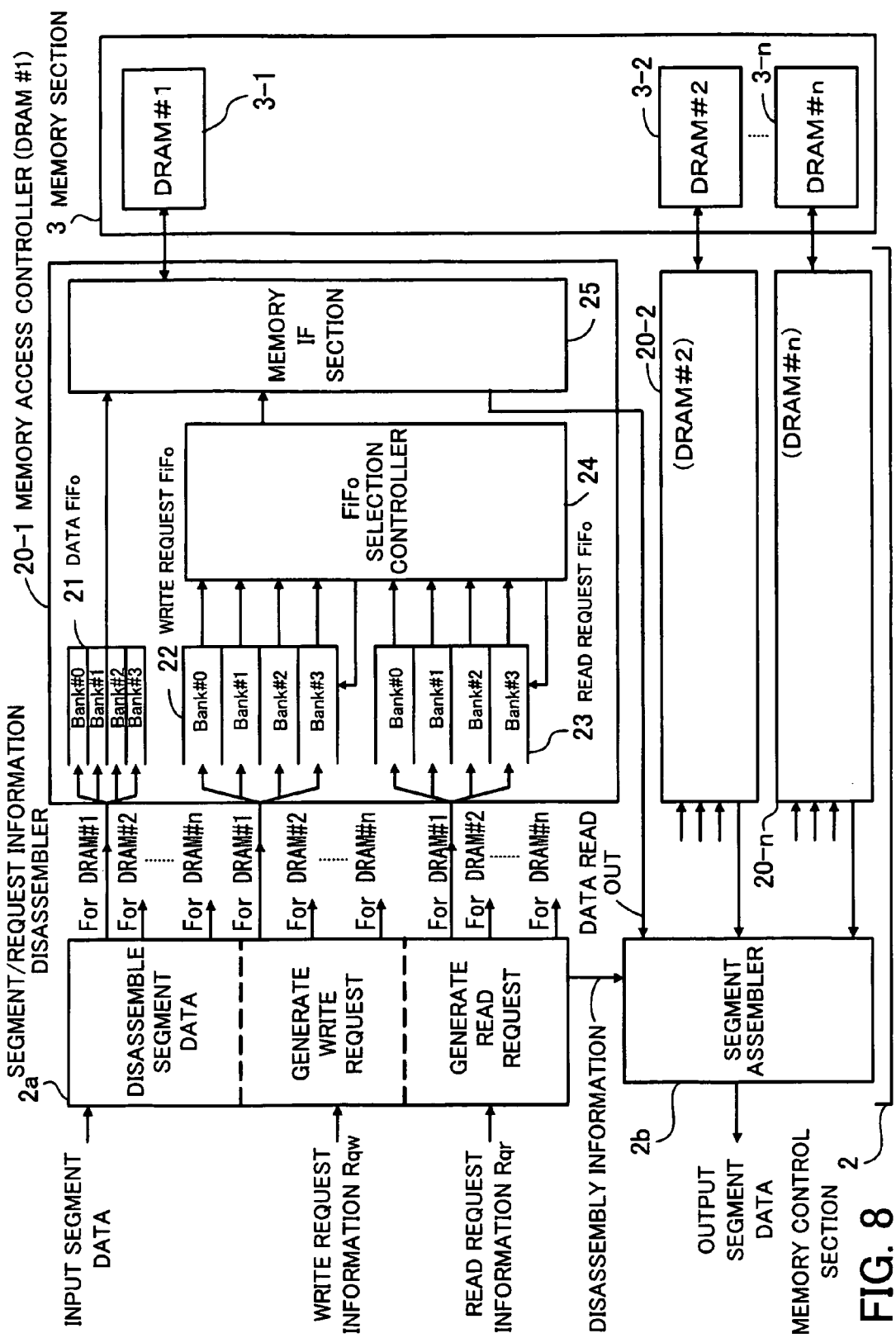
FIG. 8 is a view showing the structure of a memory control section.

FIG. 8 is a view showing the structure of the memory control section 2. The memory control section 2 includes the segment/request information disassembler 2a, memory access controllers 20-1 through 20-n, and the segment assembler 2b.

The number of the memory access controllers 20-1 through 20-n located corresponds to that of the DRAMs. Each memory access controller includes data first in first out memories (FIFOs) 21 (corresponding to data memories), write request FIFOs 22 (corresponding to write request memories), read request FIFOs 23 (corresponding to read request memories), a FIFO selection controller 24 (corresponding to a memory selection controller) and a memory interface (IF) section 25.

The number of the data FIFOs 21, the write request FIFOs 22, and the read request FIFOs 23 located corresponds to that of banks of a DRAM. For example, if 6 DRAMs each having 4 banks are located, then 6 memory access controllers are included. 4 data FIFOs 21 are included in each memory access controller, so a total of 24 (=4×6) data FIFOs 21 are required. The same applies to the write request FIFOs 22 and the read request FIFOs 23.

The memory IF sections 25 control an interface between the memory access controllers 20-1 through 20-n and the memory section 3. For example, each memory IF section 25 converts a command and an address outputted from a corresponding memory access controller 20 into a data format acceptable to an interface of the memory section 3, doubles the data rate of data to be written (DDR: double data rate), or extracts data to be read out from the memory section 3.

The segment/request information disassembler 2a will now be described. The segment/request information disassembler 2a disassembles the received segment data by the DRAM access unit and gives serial numbers (SNs) to data after the disassembly. In addition, the segment/request information disassembler 2a allocates the data to the data FIFOs 21 of corresponding memory access controllers 20 located at the next stage on the basis of write request information received.

At this time the segment/request information disassembler 2a generates a write request corresponding to each piece of data obtained by disassembling the received segment data by the DRAM access unit, gives serial numbers to write requests, and allocates the write requests to the write request FIFOs 22 of corresponding memory access controllers 20 located at the next stage.

When the segment/request information disassembler 2a receives read request information, the segment/request information disassembler 2a generates a read request corresponding to each piece of data which has been disassembled by the DRAM access unit, gives serial numbers to read requests, and allocates the read request to the read request FIFOs 23 of corresponding memory access controllers 20 located at the next stage.

Figure 9:
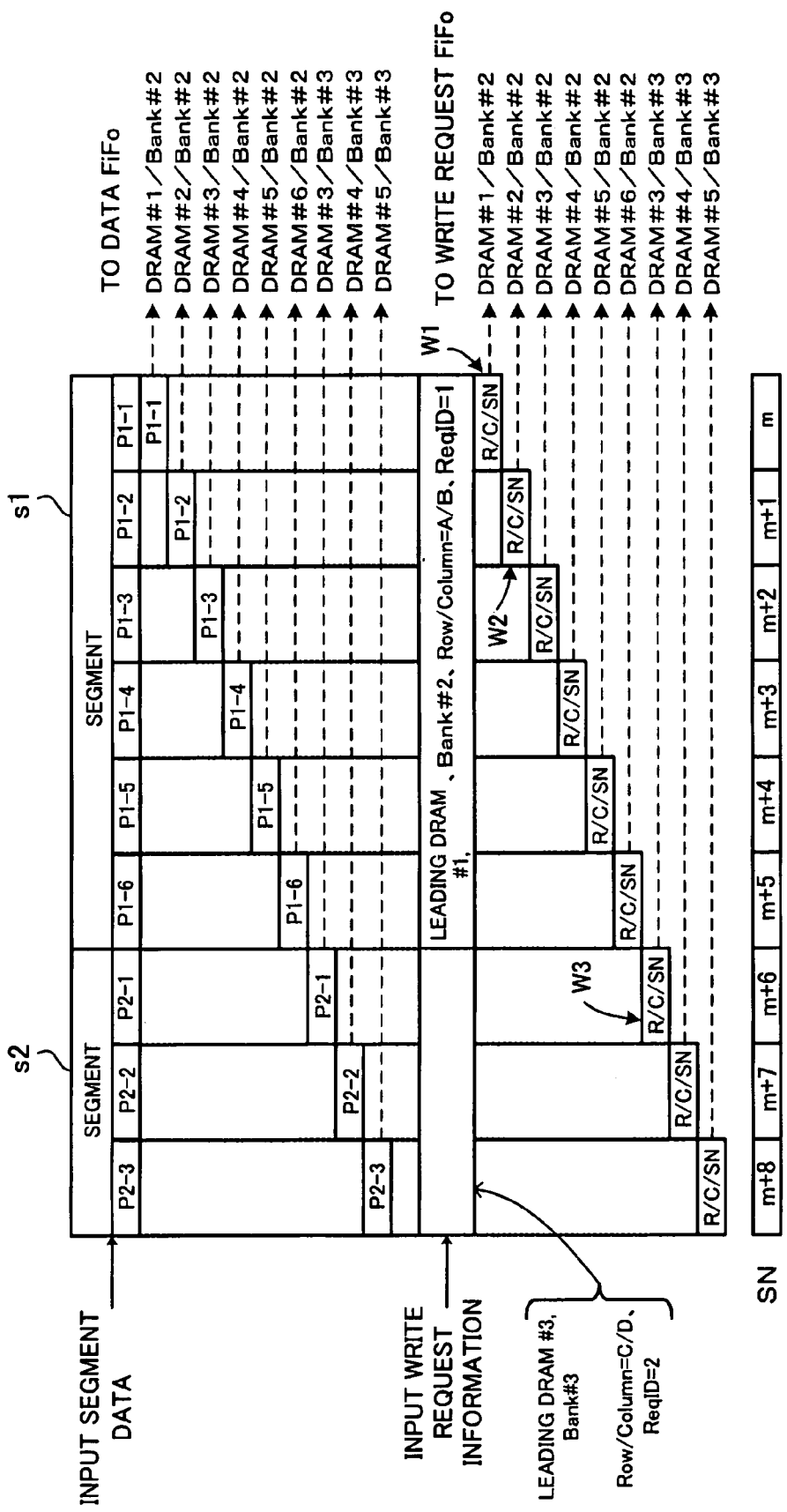
FIG. 9 is a view showing the operation of allocating segment data and write requests.

FIG. 9 is a view showing the operation of allocating segment data and write requests. It is assumed that 6 DRAMs (DRAMs #1 through #6) each having 4 banks (banks #0 through #3) are located. The segment/request information disassembler 2a disassembles the segment s1 into the page areas P1-1 through P1-6 each of which is a DRAM access unit.

It is assumed that the segment/request information disassembler 2a receives write request information regarding the segment s1 in which "1" is indicated in the Request ID item and that "#1/#2" and "A/B" are indicated in the Leading DRAM Number/Bank Number and Row/Column items, respectively, of this write request information.

As can be seen from this write request information, a leading DRAM and a bank in which the segment s1 is stored are the DRAM #1 and the bank #2 respectively. Accordingly, the segment/request information disassembler 2a sends the page P1-1 to a data FIFO corresponding to the DRAM #1/bank #2. That is to say, the segment/request information disassembler 2a sends the page P1-1 to a data FIFO corresponding to the bank #2 of the data FIFO 21 in the memory access controller 20 for the DRAM #1.

The segment/request information disassembler 2a generates row/column addresses of the DRAM #1/bank #2 where the page P1-1 is to be stored and a serial number (m) as a write request (write request W1) for the page P1-1 (write requests are generated according to access unit (according to page)) and sends the write request W1 to a write request FIFO corresponding to the DRAM #1/bank #2.

That is to say, the segment/request information disassembler 2a sends the write request W1 to a write request FIFO corresponding to the bank #2 of the write request FIFO 22 in the memory access controller 20 for the DRAM #1.

As can be seen from the above write request information, a DRAM and a bank in which the page P1-2 is to be stored are the DRAM #2 and the bank #2 respectively. (A leading DRAM number is #1, so a next DRAM in which the page P1-2 is stored is the DRAM #2. As stated above, the number of all banks used is the same.) Accordingly, the segment/request information disassembler 2a sends the page P1-2 to a data FIFO corresponding to the DRAM #2/bank #2.

That is to say, the segment/request information disassembler 2a sends the page P1-2 to a data FIFO corresponding to the bank #2 of the data FIFO 21 in the memory access controller 20 for the DRAM #2.

The segment/request information disassembler 2a generates row/column addresses of the DRAM #2/bank #2 where the page P1-2 is to be stored and a serial number (m+1) as a write request (write request W2) for the page P1-2 and sends the write request W2 to a write request FIFO corresponding to the DRAM #2/bank #2.

That is to say, the segment/request information disassembler 2a sends the write request W2 to a write request FIFO corresponding to the bank #2 of the write request FIFO 22 in the memory access controller 20 for the DRAM #2.

The pages P1-3 through P1-6 and write requests corresponding thereto are then allocated to corresponding FIFOs in the same way. A leading DRAM number is #1, so the pages P1-2 through P1-6 and write requests corresponding thereto are sequentially allocated to the DRAMs #2 through #6, respectively, in that order.

Segment length is indicated in write request information, so write requests the number of which corresponds to a value obtained by dividing the segment length by the access unit are sequentially generated on the basis of the leading DRAM number.

The segment/request information disassembler 2a then disassembles the segment s2 into the page areas P2-1 through P2-3 each of which is the DRAM access unit. It is assumed that the segment/request information disassembler 2a receives write request information regarding the segment s2 in which "2" is indicated in the Request ID item and that "#3/#3" and "C/D" are indicated in the Leading DRAM Number/Bank Number and Row/Column items, respectively, of this write request information.

As can be seen from this write request information, a leading DRAM and a bank in which the segment s2 is to be stored are the DRAM #3 and the bank #3 respectively. Accordingly, the segment/request information disassembler 2a sends the page P2-1 to a data FIFO corresponding to the DRAM #3/bank #3. That is to say, the segment/request information disassembler 2a sends the page P2-1 to a data FIFO corresponding to the bank #3 of the data FIFO 21 in the memory access controller 20 for the DRAM #3.

The segment/request information disassembler 2a generates row/column addresses of the DRAM #3/bank #3 where the page P2-1 is to be stored and a serial number (m+6) as a write request (write request W3) for the page P2-1 and sends the write request W3 to a write request FIFO corresponding to the DRAM #3/bank #3.

That is to say, the segment/request information disassembler 2a sends the write request W3 to a write request FIFO corresponding to the bank #3 of the write request FIFO 22 in the memory access controller 20 for the DRAM #3.

The pages P2-2 and P2-3 and write requests corresponding thereto are then allocated to corresponding FIFOs in the same way (leading DRAM number is #3, so the pages P2-2 and P2-3 and the write requests corresponding thereto are sequentially allocated to the DRAMs #4 and #5, respectively, in that order.

Figure 10:
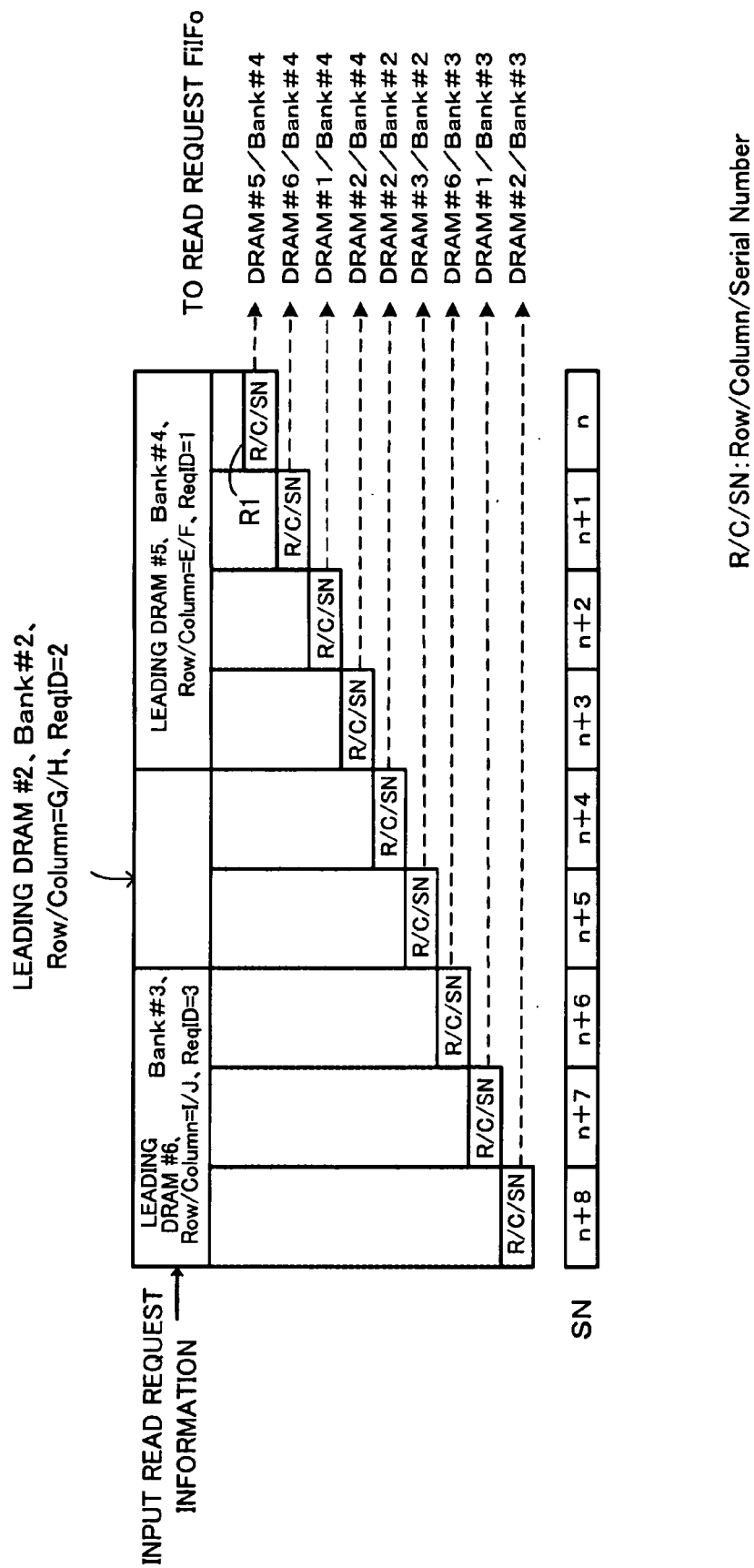
FIG. 10 is a view showing the operation of allocating read requests.

FIG. 10 is a view showing the operation of allocating read requests. It is assumed that the segment/request information disassembler 2a receives read request information in which "1" is indicated in the Request ID item and that "#5/#4" and "E/F" are indicated in the Leading DRAM Number/Bank Number and Row/Column items, respectively, of this read request information.

As can be seen from this read request information, a leading DRAM and a bank from which data is to be read out are the DRAM #5 and the bank #4 respectively. Accordingly, the segment/request information disassembler 2a generates row/column addresses of the DRAM #5/bank #4 from which the data is to be read out and a serial number (n) as a read request (read request R1) (read requests are generated according to access unit (according to page)) and sends the read request R1 to a read request FIFO corresponding to the DRAM #5/bank #4.

That is to say, the segment/request information disassembler 2a sends the read request R1 to a read request FIFO corresponding to the bank #4 of the read request FIFO 23 in the memory access controller 20 for the DRAM #5.

Read requests are then allocated to corresponding read FIFOs in the same way. A leading DRAM number is #5, so read requests are sequentially allocated to the DRAMs #6, #1, and #2 in that order.

Segment length is indicated in read request information, so read requests the number of which corresponds to a value obtained by dividing the segment length by the access unit are sequentially generated on the basis of the leading DRAM number. When the segment/request information disassembler 2a receives read request information in which "2" is indicated in the Request ID item and read request information in which "3" is indicated in the Request ID item, read requests are generated and allocated in the same way. Accordingly, descriptions of them will be omitted.

Figure 11:
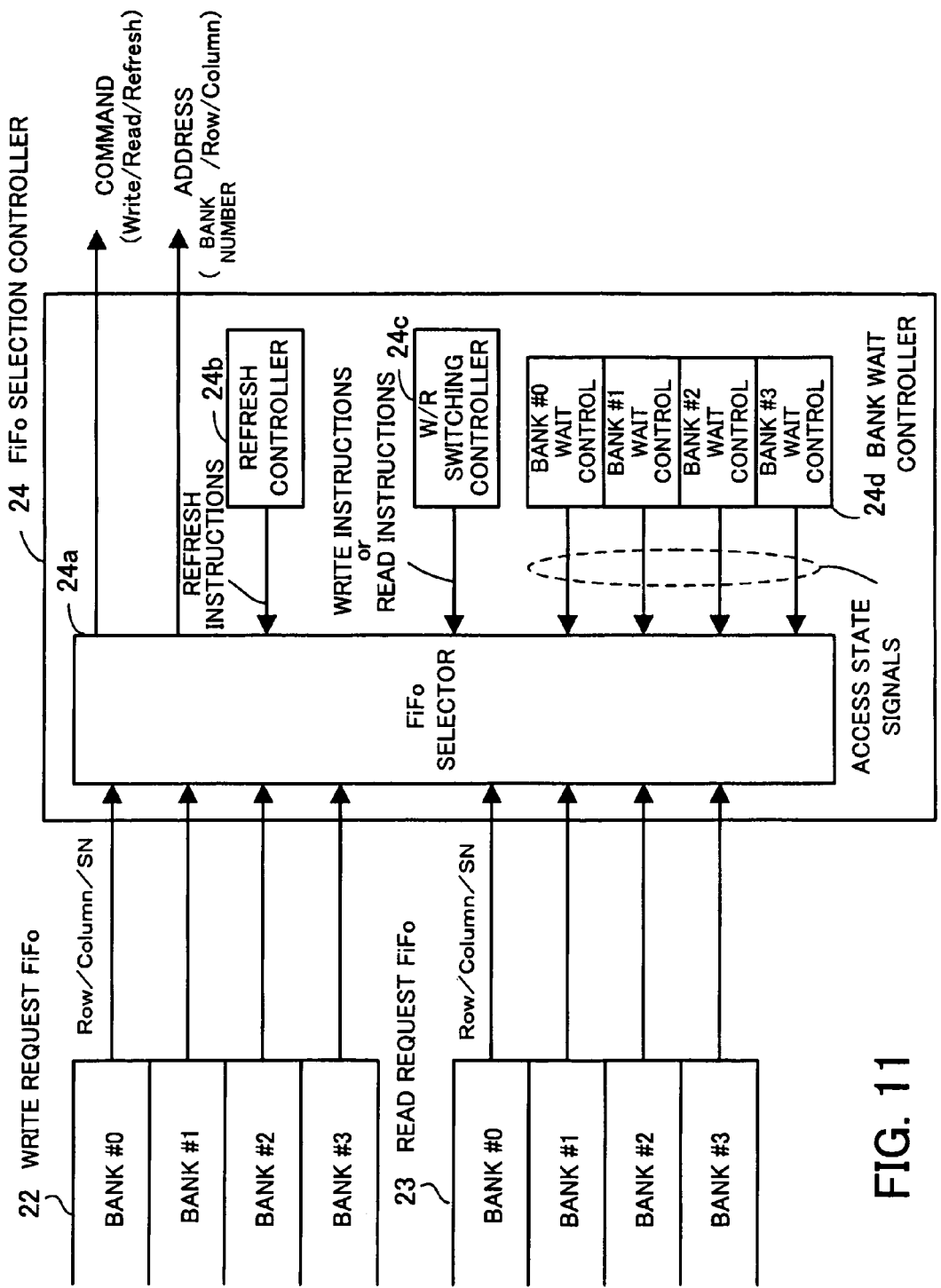
FIG. 11 is a view showing the structure of a FIFO selection controller.

The FIFO selection controller 24 will now be described. FIG. 11 is a view showing the structure of the FIFO selection controller 24. The FIFO selection controller 24 includes a FIFO selector 24a (corresponding to a memory selector), a refresh controller 24b, a write/read switching controller (W/R switching controller) 24c, and a bank wait controller 24d.

The FIFO selector 24a controls FIFO selection on the basis of contents of which the refresh controller 24b, the W/R switching controller 24c, or the bank wait controller 24d informs the FIFO selector 24a.

With basic FIFO selection control, a request FIFO to be selected next is determined by a serial number included in a write request or a read request outputted from the write request FIFO 22 or the read request FIFO 23. A command (write command/read command/refresh command) for gaining access to a DRAM and addresses (bank number/row address/column address) are then generated.

To hold information stored in a DRAM, refresh operation (operation of preventing the loss of data by replenishing a storage element of the DRAM with electric charges) must be performed regularly. Accordingly, the refresh controller 24b sends refresh instructions to the FIFO selector 24a at constant time intervals.

When the FIFO selector 24a receives the refresh instructions, the FIFO selector 24a sends a refresh command for actually performing refresh operation to a corresponding DRAM. However, if the FIFO selector 24a receives the refresh instructions during write access to the DRAM, then the FIFO selector 24a puts refresh operation in a wait state (FIFO selector 24a does not output the refresh command) until switching from the write access to read access is performed. When the selection of the write request FIFO 22 terminates and switching from the write access to read access is performed, the FIFO selector 24a sends the refresh command to the DRAM.

Similarly, if the FIFO selector 24a receives refresh instructions during read access to a DRAM, then the FIFO selector 24a puts refresh operation in a wait state (FIFO selector 24a does not output a refresh command) until switching from the read access to write access is performed. When the selection of the read request FIFO 23 terminates and switching from the read access to write access is performed, the FIFO selector 24a sends the refresh command to the DRAM.

The W/R switching controller 24c exercises control for equalizing write access with read access to the DRAM. The W/R switching controller 24c uses the following control method. The W/R switching controller 24c counts the number of times a write command is generated to gain access to the DRAM and the number of times a read command is generated to gain access to the DRAM. When the count reaches a prescribed number, the W/R switching controller 24c outputs switching instructions to the FIFO selector 24a to perform switching from write access to read access or from read access to write access.

For example, when write access to the DRAM is gained continuously and the number of times write access is gained reaches a prescribed number, the W/R switching controller 24c outputs switching instructions to gain read access from next time. When the FIFO selector 24a receives write instructions from the W/R switching controller 24c, the FIFO selector 24a selects the write request FIFO 22. When the FIFO selector 24a receives read instructions from the W/R switching controller 24c, the FIFO selector 24a selects the read request FIFO 23.

Figure 16:
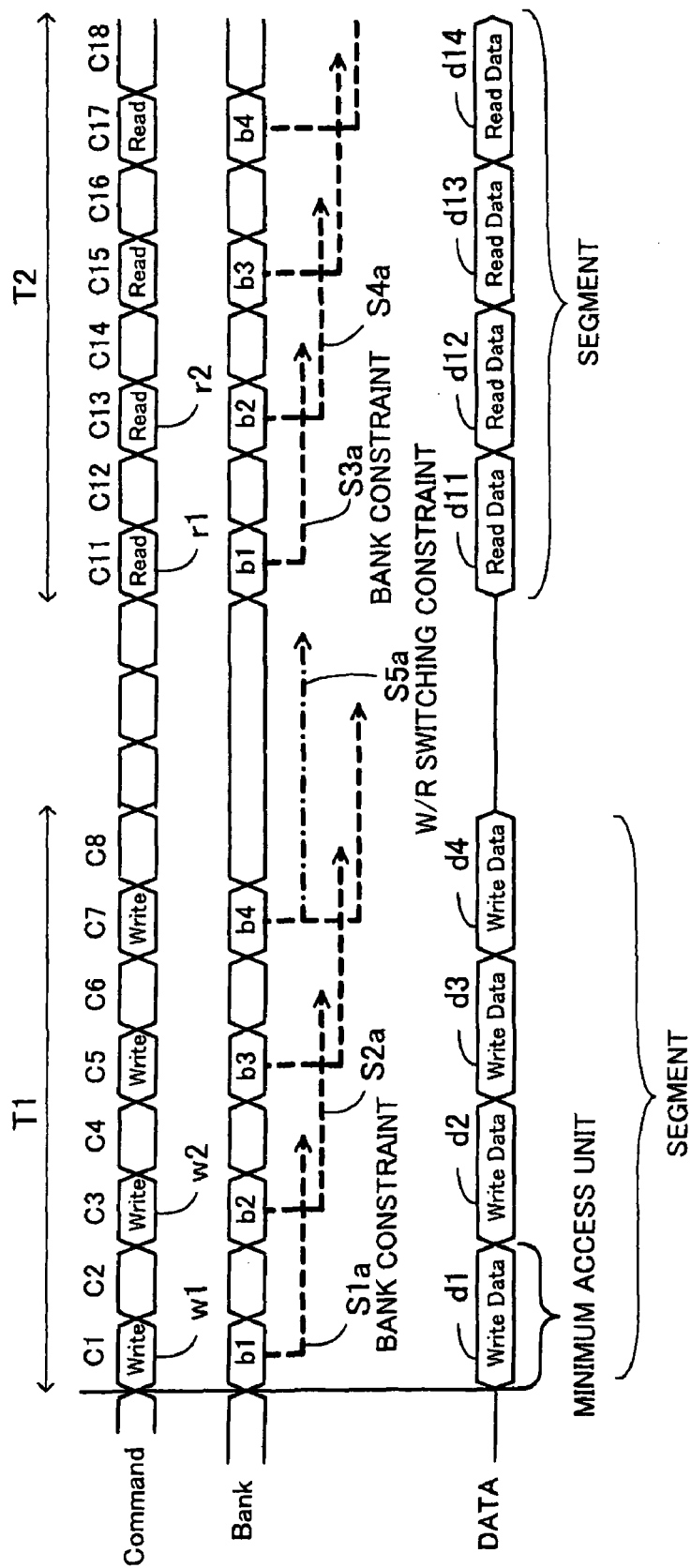
FIG. 16 is a view showing a time chart of a DRAM interface.
Figure 17:
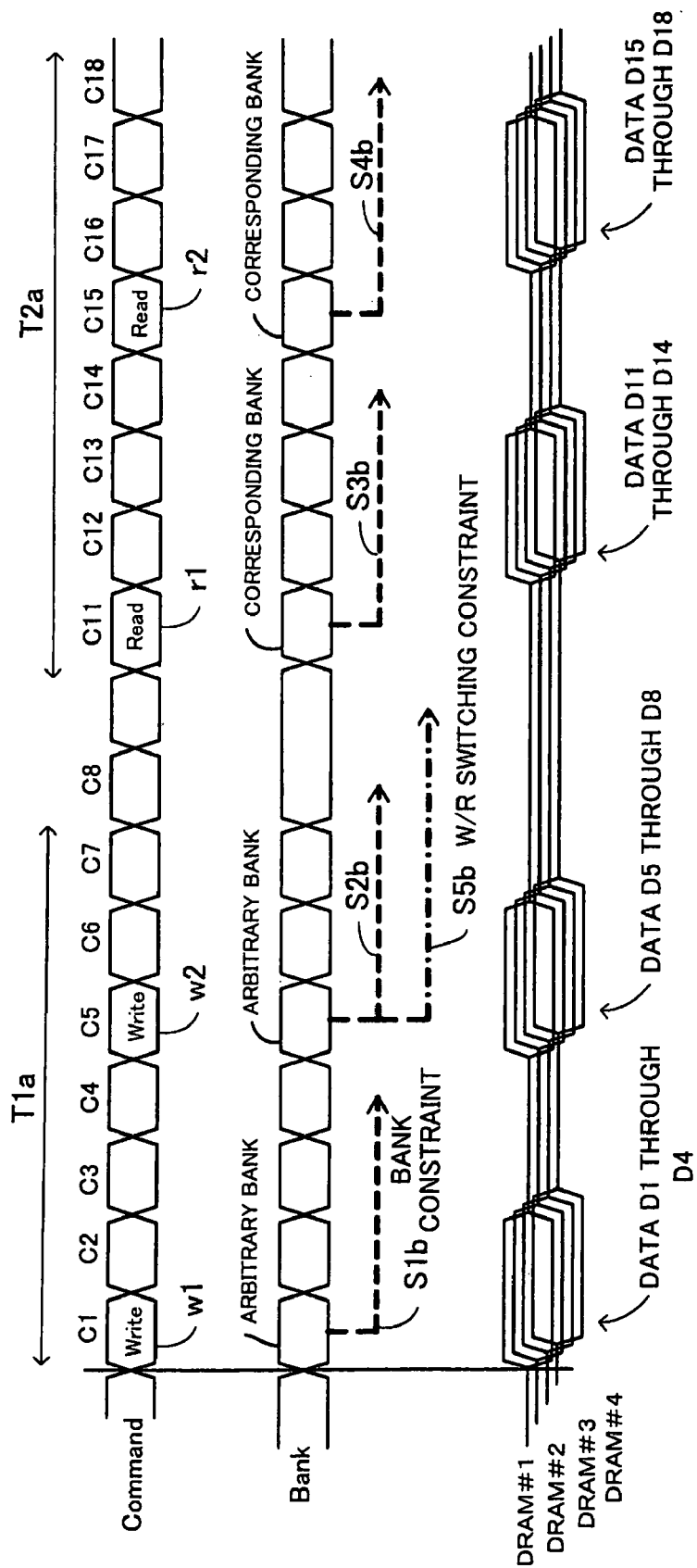
FIG. 17 is a view showing a time chart of a DRAM interface.
Figure 18:
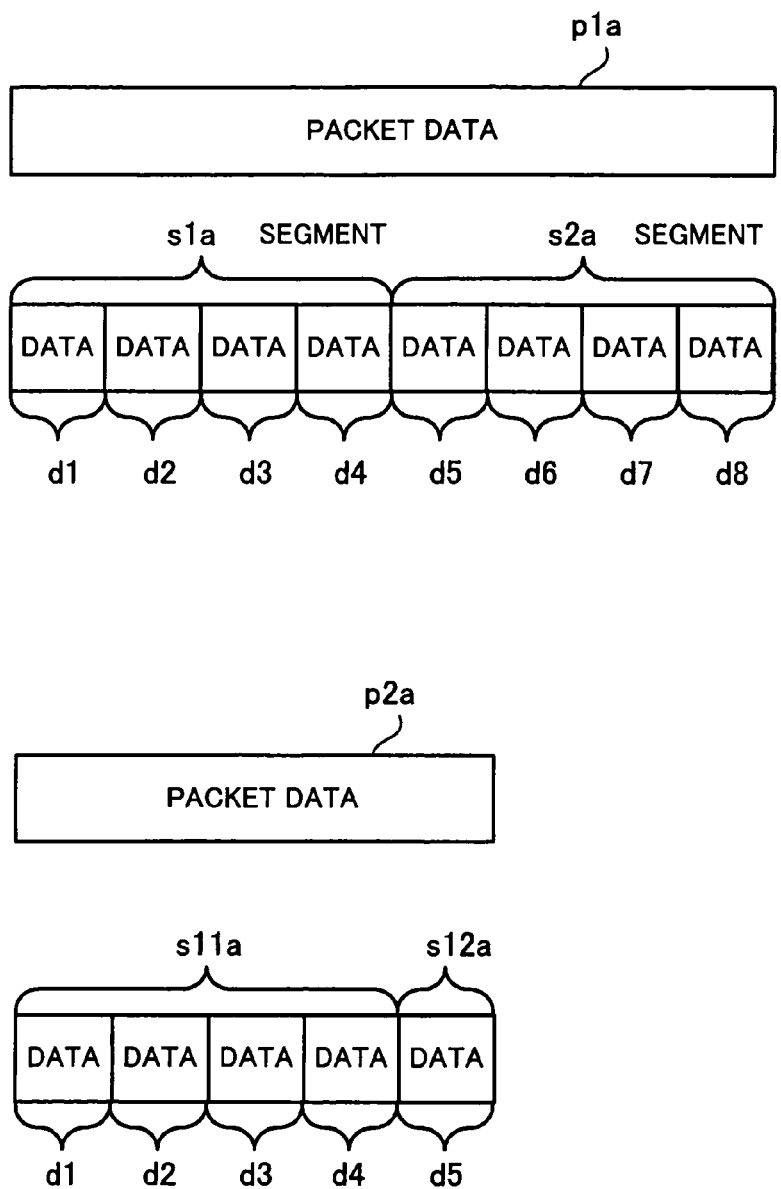
FIG. 18 is a view showing the structure of a packet.
Figure 19:
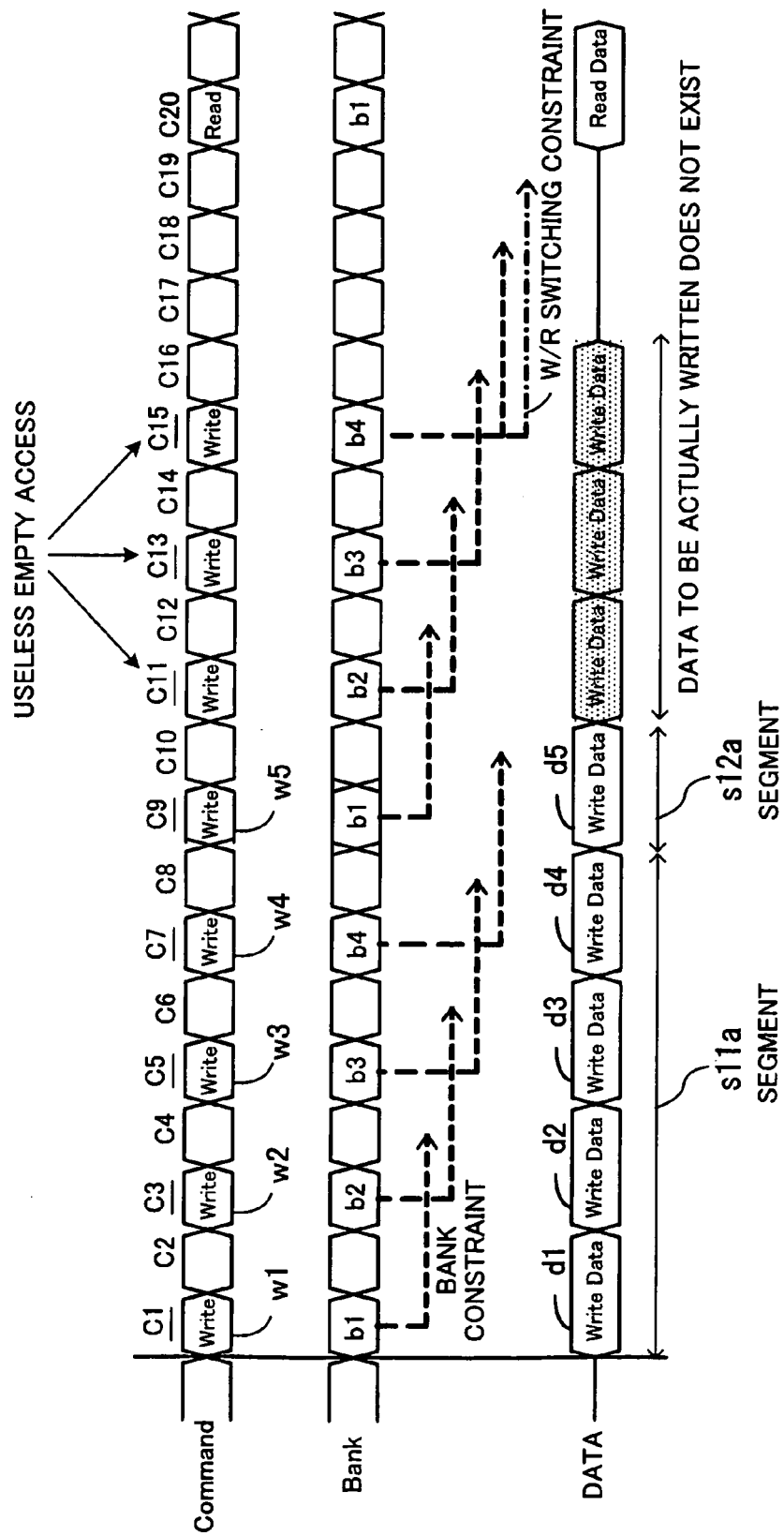
FIG. 19 is a view for describing the reason for a decrease in transfer rate.

The bank wait controller 24d manages the bank constraints described in FIGS. 16 and 17. The bank wait controller 24d sends access state signals that indicate which banks are now accessible and access to which banks is now prohibited to the FIFO selector 24a. When the FIFO selector 24a receives the access state signals, the FIFO selector 24a recognizes a state of a bank constraint imposed on each bank and selects a request FIFO corresponding to a bank access to which is not prohibited.

Figure 12:
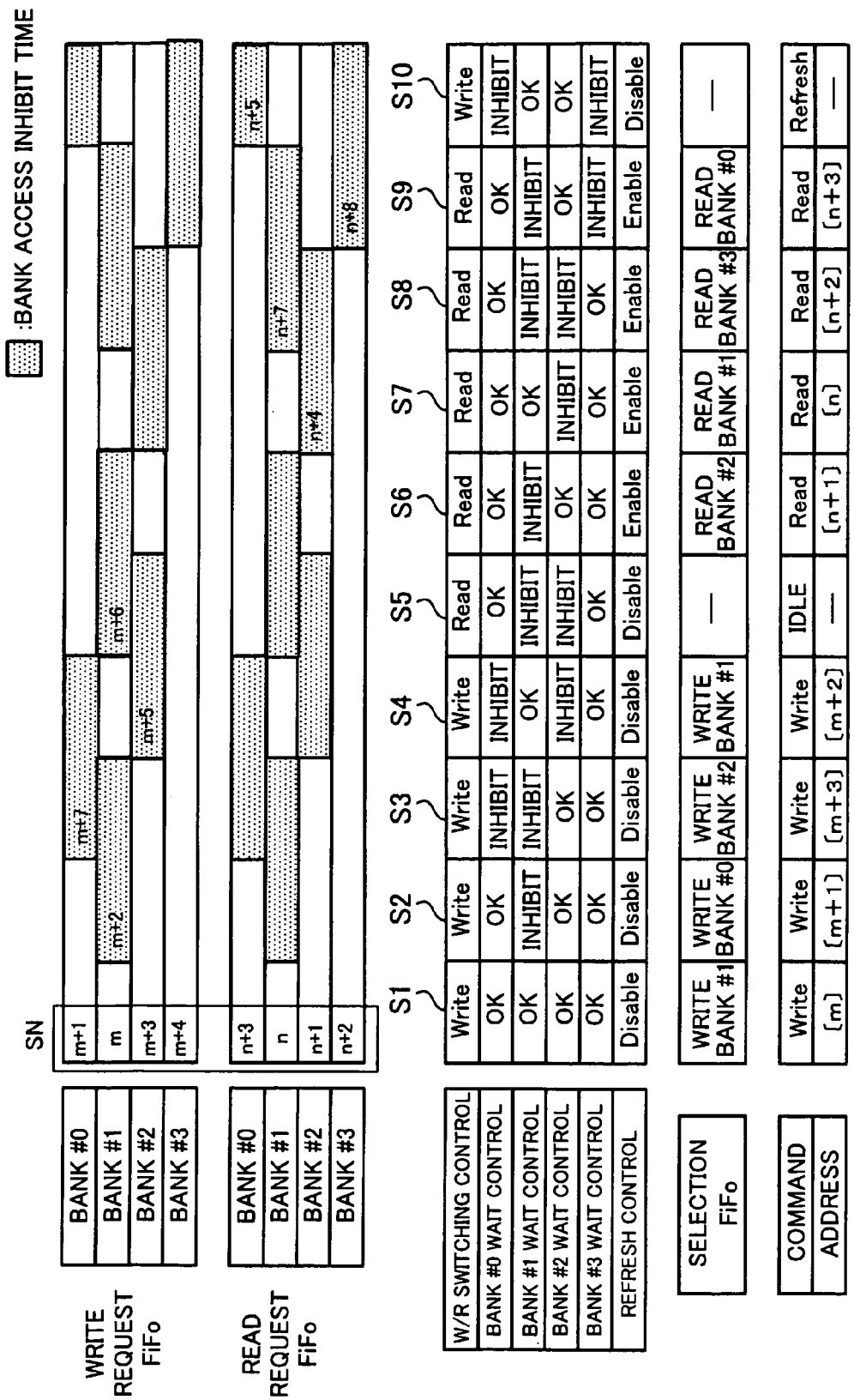
FIG. 12 is a view showing access scheduling by a FIFO selector.

FIG. 12 is a view showing access scheduling by the FIFO selector 24a. It is assumed that write requests (m+1), (m), (m+3), and (m+4) are stored in a write request FIFO (bank #0), (bank #1), (bank #2), and (bank #3), respectively, at a leading output position of the write request FIFO 22. A serial number of each write request is indicated in parentheses.

On the other hand, it is assumed that read requests (n+3), (n), (n+1), and (n+2) are stored in a read request FIFO (bank #0), (bank #1), (bank #2), and (bank #3), respectively, at a leading output position of the read request FIFO 23. The serial number of each read request is indicated in parentheses. In FIG. 12, bank constraint time (bank access inhibit time) is set to two access units.

[S1] The FIFO selector 24a receives notice of scheduling from the W/R switching controller 24c, the bank wait controller 24d, and the refresh controller 24b. In this example, write instructions are given, all of the banks #0 through #3 are accessible (OK), and refresh instructions are "Disable" (refresh is not performed).

The serial numbers of the write requests which can be read out from the write request FIFO (banks #0 through #3) are (m+1), (m), (m+3), and (m+4) respectively. Accordingly, the FIFO selector 24a selects the write request FIFO (bank #1) in which the lowest serial number (m) is stored, and extracts the write request (m) from the write request FIFO (bank #1).

The FIFO selector 24a then generates a write command and write addresses (bank #1/row/column) on the basis of the write request (m) extracted and sends the write command and the write addresses to a DRAM (the FIFO selector 24a reads out corresponding data from the data FIFO 21 via the memory IF section 25 and writes the data to the DRAM via the memory IF section 25 by the use of the write command and the write addresses).

In FIG. 12, [m], for example, indicated as an address represents addresses (in this case, the bank #1 and row/column addresses of the bank #1) regarding the request the serial number of which is (m).

[S2] The FIFO selector 24a receives notice of scheduling. Write instructions are given. Access to the bank #1 is prohibited. The banks #0, #2, and #3 are accessible. Refresh instructions are "Disable.

The serial numbers of the write requests which can be read out from the write request FIFO (banks #0, #2, and #3) corresponding to the banks #0, #2, and #3 are (m+1), (m+3), and (m+4) respectively. Accordingly, the FIFO selector 24a selects the write request FIFO (bank #0) in which the lowest serial number (m+1) is stored, and extracts the write request (m+1) from the write request FIFO (bank #0). The FIFO selector 24a generates a write command and write addresses (bank #0/row/column) on the basis of the write request (m+1) extracted and sends the write command and the write addresses to the DRAM.

[S3] The FIFO selector 24a receives notice of scheduling. Write instructions are given. Access to the banks #0 and #1 is prohibited. The banks #2 and #3 are accessible. Refresh instructions are "Disable.

The serial numbers of the write requests which can be read out from the write request FIFO (banks #2 and #3) corresponding to the banks #2 and #3 are (m+3) and (m+4) respectively. Accordingly, the FIFO selector 24a selects the write request FIFO (bank #2) in which the lower serial number (m+3) is stored, and extracts the write request (m+3) from the write request FIFO (bank #2). The FIFO selector 24a then generates a write command and write addresses (bank #2/row/column) on the basis of the write request (m+3) extracted and sends the write command and the write addresses to the DRAM.

[S4] The FIFO selector 24a receives notice of scheduling. Write instructions are given. A bank constraint imposed on the bank #1 is removed and the bank #1 becomes accessible. Access to the banks #0 and #2 is prohibited and the bank #3 is accessible. Refresh instructions are "Disable.

The serial numbers of the write requests which can be read out from the write request FIFO (banks #1 and #3) corresponding to the banks #1 and #3 are (m+2) and (m+4) respectively (the write request (m+2) is stored second in the write request FIFO (bank #1)). Accordingly, the FIFO selector 24a selects the write request FIFO (bank #1) in which the lower serial number (m+2) is stored, and extracts the write request (m+2) from the write request FIFO (bank #1). The FIFO selector 24a then generates a write command and write addresses (bank #1/row/column) on the basis of the write request (m+2) extracted and sends the write command and the write addresses to the DRAM.

[S5] The FIFO selector 24a receives notice of scheduling. Switching from write instructions to read instructions is performed. A bank constraint imposed on the bank #0 is removed and the bank #0 becomes accessible. Access to the banks #1 and #2 is prohibited and the bank #3 is accessible. Refresh instructions are "Disable".

Switching from writing to reading is performed, so a switching constraint is created. The FIFO selector 24a stops the operation of selecting a FIFO until the switching constraint terminates. Therefore, the FIFO selector 24a does not output a command or an address.

[S6] The switching constraint terminates. The FIFO selector 24a receives notice of scheduling. Read instructions are given. A bank constraint imposed on the bank #2 is removed and the bank #2 becomes accessible. Access to the bank #1 is prohibited and the banks #0 and #3 are accessible. Refresh instructions are "Enable" (refresh is performed).

The serial numbers of the read requests which can be read out from the read request FIFO (banks #0, #2, and #3) corresponding to the banks #0, #2, and #3 are (n+3), (n+1), and (n+2) respectively. Accordingly, the FIFO selector 24a selects the read request FIFO (bank #2) in which the lowest serial number (n+1) is stored, and extracts the read request (n+1) from the read request FIFO (bank #2).

The FIFO selector 24a then generates a read command and read addresses (bank #2/row/column) on the basis of the read request (n+1) extracted, sends the read command and the read addresses to the DRAM, and reads out corresponding data (FIFO selector 24a reads out the corresponding data from the DRAM via the memory IF section 25 by the use of the read command and the read addresses).

At this time refresh instructions are "Enable," so usually a refresh command is sent to the DRAM. However, read access to the DRAM is now being gained, so a refresh command is not outputted until the read access to the DRAM terminates.

[S7] The FIFO selector 24a receives notice of scheduling. Read instructions are given. Access to the bank #2 is prohibited and the banks #0, #1, and #3 are accessible. Refresh instructions are "Enable". (The FIFO selector 24a does not output a refresh command after the FIFO selector 24a receives "Enable" in step S6. Accordingly, the refresh controller 24b continues to output "Enable" as refresh instructions.)

The serial numbers of the read requests which can be read out from the read request FIFO (banks #0, #1, and #3) corresponding to the banks #0, #1, and #3 are (n+3), (n), and (n+2) respectively. Accordingly, the FIFO selector 24a selects the read request FIFO (bank #1) in which the lowest serial number (n) is stored, and extracts the read request (n) from the read request FIFO (bank #1). The FIFO selector 24a then generates a read command and read addresses (bank #1/row/column) on the basis of the read request (n) extracted, sends the read command and the read addresses to the DRAM, and reads out corresponding data.

[S8] The FIFO selector 24a receives notice of scheduling. Read instructions are given. Access to the banks #1 and #2 is prohibited and the banks #0 and #3 are accessible. Refresh instructions are "Enable".

The serial numbers of the read requests which can be read out from the read request FIFO (banks #0 and #3) corresponding to the banks #0 and #3 are (n+3) and (n+2) respectively. Accordingly, the FIFO selector 24a selects the read request FIFO (bank #3) in which the lower serial number (n+2) is stored, and extracts the read request (n+2) from the read request FIFO (bank #3). The FIFO selector 24a then generates a read command and read addresses (bank #3/row/column) on the basis of the read request (n+2) extracted, sends the read command and the read addresses to the DRAM, and reads out corresponding data.

[S9] The FIFO selector 24a receives notice of scheduling. Read instructions are given. Access to the banks #1 and #3 is prohibited and the banks #0 and #2 are accessible. Refresh instructions are "Enable".

The serial numbers of the read requests which can be read out from the read request FIFO (banks #0 and #2) corresponding to the banks #0 and #2 are (n+3) and (n+4) respectively (read request (n+4) is stored second in the read request FIFO (bank #2)). Accordingly, the FIFO selector 24a selects the read request FIFO (bank #0) in which the lower serial number (n+3) is stored, and extracts the read request (n+3) from the read request FIFO (bank #0). The FIFO selector 24a then generates a read command and read addresses (bank #0/row/column) on the basis of the read request (n+3) extracted, sends the read command and the read addresses to the DRAM, and reads out corresponding data.

[S10] The FIFO selector 24a receives notice of scheduling. Switching from read instructions to write instructions is performed. Access to the banks #0 and #3 is prohibited and the banks #1 and #2 are accessible. When the FIFO selector 24a recognizes the termination of read access and a shift to write access, the FIFO selector 24a sends a refresh command to the corresponding DRAM. The refresh controller 24b sets refresh instructions to "Disable" because the refresh command is outputted.

The segment assembler 2b will now be described. Data is not always read out from a DRAM in the original order. Accordingly, the segment assembler 2b temporarily holds read data sent from the memory section 3, rearranges the read data in the original order on the basis of disassembly information sent from the segment/request information disassembler 2a, reassembles the read data into a segment, and outputs segment data.

Figure 13:
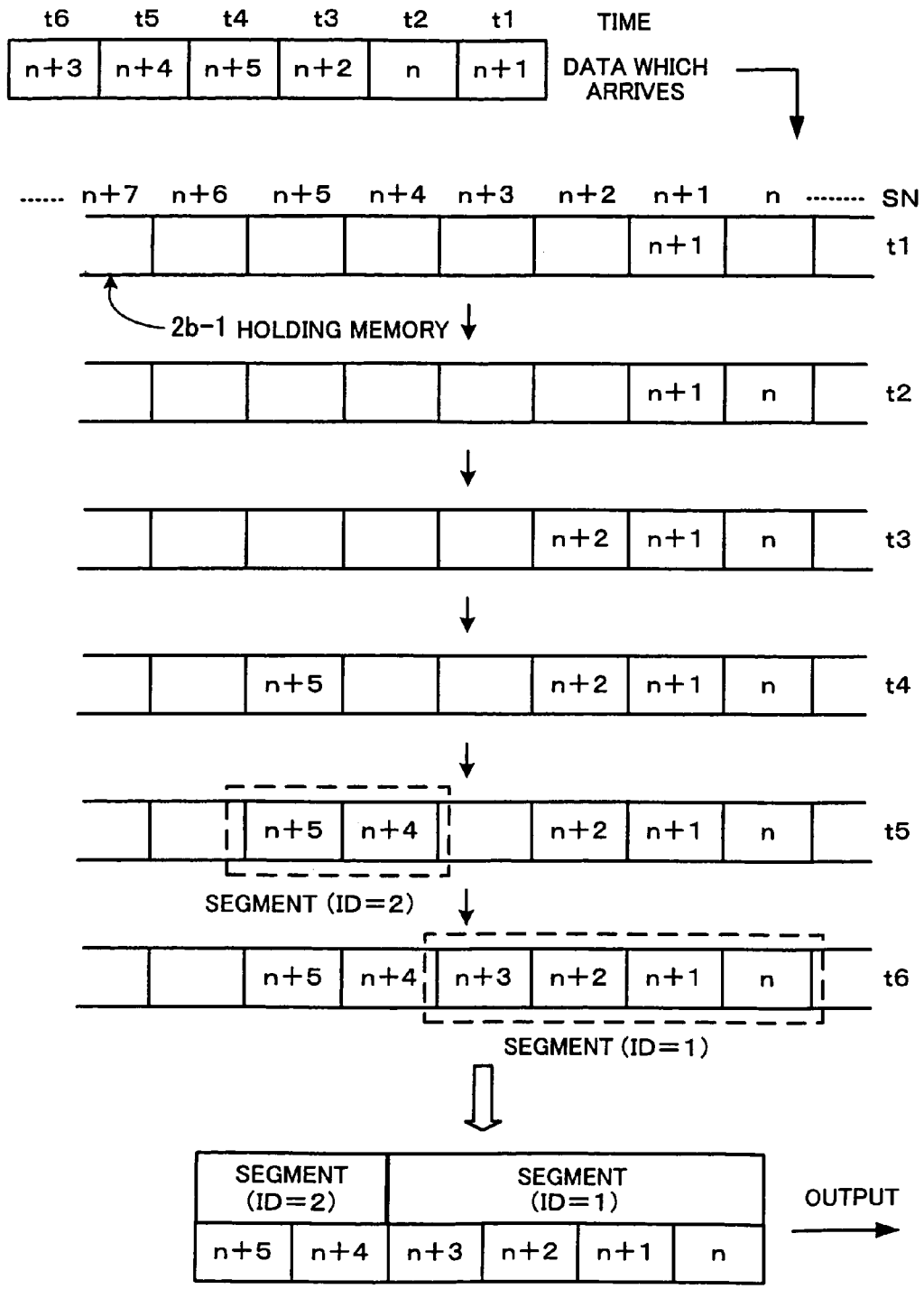
FIG. 13 is a view showing the operation of a segment assembler.

FIG. 13 is a view showing the operation of the segment assembler 2b. FIG. 14 is a view showing disassembly information. It is assumed that read data (n+1), (n), (n+2), (n+5), (n+4), and (n+3) reach the segment assembler 2b at time t1, t2, t3, t4, t5, and t6 respectively. The serial number of each piece of read data is indicated in parentheses.

On the other hand, disassembly information is sent from the segment/request information disassembler 2a to the segment assembler 2b. Disassembly information includes Request ID, Leading Serial Number, and Disassembly Number items.

With disassembly information D1 shown in FIG. 14, "1," "n," and "4" are indicated in the Request ID, Leading Serial Number, and Disassembly Number items respectively. This means that the serial number of leading data in a segment the request ID of which is "1" is "n" and that this segment is disassembled into 4 pieces of data.

With disassembly information D2, "2," "n+4," and "2" are indicated in the Request ID, Leading Serial Number, and Disassembly Number items respectively. This means that the serial number of leading data in a segment the request ID of which is "2" is "n+4" and that this segment is disassembled into 2 pieces of data.

The segment assembler 2b includes a holding memory 2b-1 for holding read data. A storage area of the holding memory 2b-1 is divided according to serial number and read data which reaches the segment assembler 2b is stored and held in an area the serial number of which is the same as the serial number of the read data.

[t1] The read data (n+1) which reaches the segment assembler 2b at the time t1 is stored in a storage area (n+1).

[t2] The read data (n) which reaches the segment assembler 2b at the time t2 is stored in a storage area (n).

[t3] The read data (n+2) which reaches the segment assembler 2b at the time t3 is stored in a storage area (n+2).

[t4] The read data (n+5) which reaches the segment assembler 2b at the time t4 is stored in a storage area (n+5).

[t5] The read data (n+4) which reaches the segment assembler 2b at the time t5 is stored in a storage area (n+4). The segment assembler 2b recognizes from the disassembly information D2 that the read data (n+4) and the read data (n+5) make up a segment. In this example, however, the request ID of this segment is "2". Therefore, the segment the request ID of which is "2" is held. That is to say, this segment is not outputted until a segment the request ID of which is "1" is assembled.

[t6] The read data (n+3) which reaches the segment assembler 2b at the time t6 is stored in a storage area (n+3). The segment assembler 2b recognizes from the disassembly information D1 that the read data (n) through (n+3) make up a segment the request ID of which is "1". The segment assembler 2b outputs segment data the request ID of which is "1," and then segment data the request ID of which is "2".

As has been described, the segment assembler 2b waits for the arrival of all data by the segment. In addition, the segment assembler 2b monitors a request ID state and outputs segment data in order of request ID. The above control is exercised and packet data is reassembled. By doing so, the order in which packets are read out can be guaranteed even if the order in which packets are outputted differs from the order in which they arrive because of QoS control.

Figure 15:
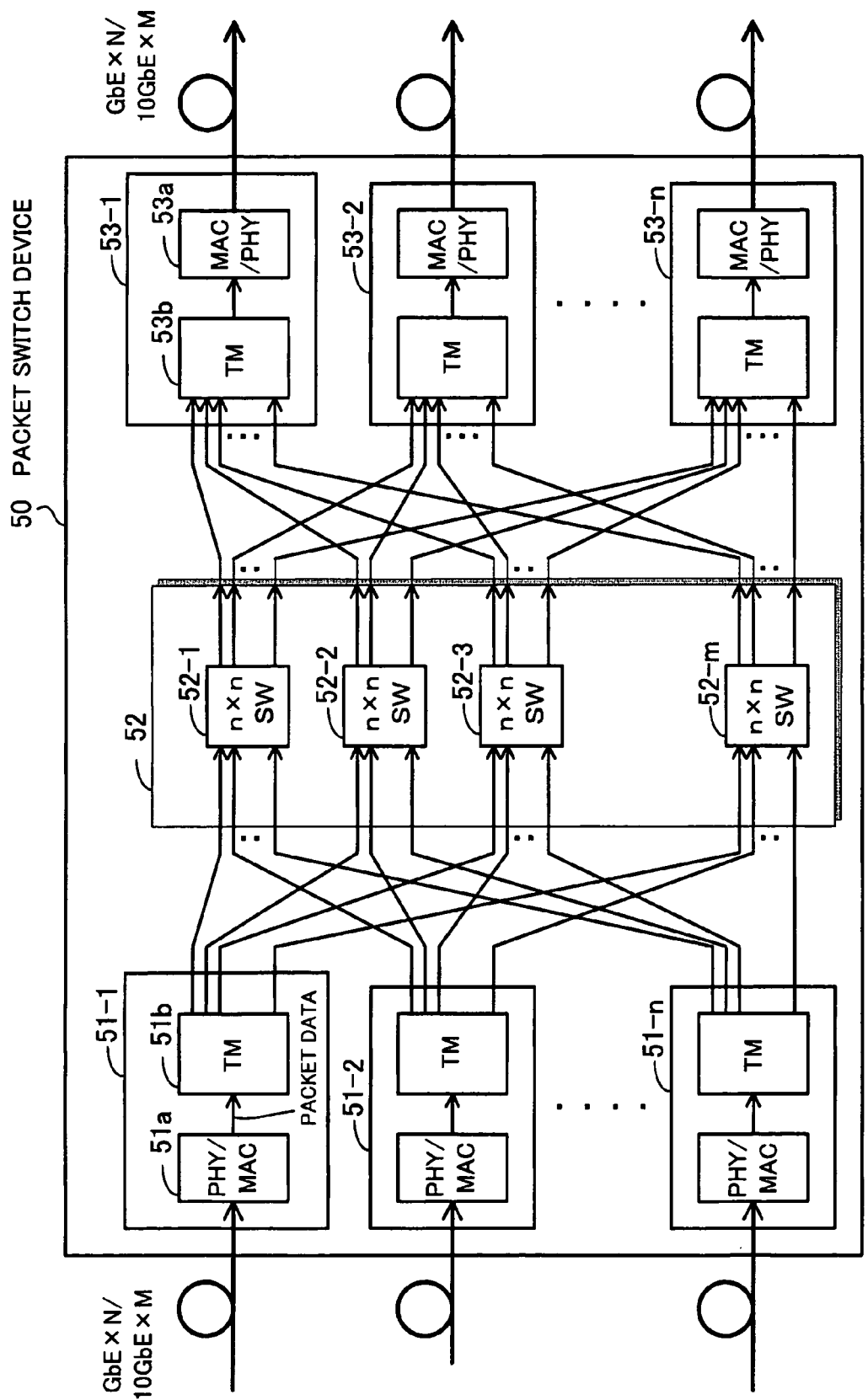
FIG. 15 is a view showing the structure of a packet switch device.

The structure of, for example, a packet switch device to which the memory control device 1 is applied will now be described. FIG. 15 is a view showing the structure of a packet switch device. A packet switch device 50 comprises receiving-end interface cards 51-1 through 51-n, a switch device 52, and sending-end interface cards 53-1 through 53-n.

Each of the receiving-end interface cards 51-1 through 51-n includes a physical (PHY)/media access control (MAC) handling section 51a and a traffic manager 51b. The traffic manager 51b includes the memory control device 1 and the memory section 3.

The switch device 52 includes n×n switches 52-1 through 52-m. Each of the sending-end interface cards 53-1 through 53-n includes a MAC/physical (PHY) handling section 53a and a traffic manager 53b. The traffic manager 53b includes the memory control device 1 and the memory section 3.

The PHY/MAC handling section 51a included in each of the receiving-end interface cards 51-1 through 51-n performs a receiving process and a receiving MAC process at the physical layer of Gigabit Ethernet (GbE)/10 GbE (Ethernet is a registered trademark). The traffic manager 51b performs input data processing (including QoS control).

The traffic manager 53b included in each of the sending-end interface cards 53-1 through 53-n performs output data processing (including QoS control). The MAC/PHY handling section 53a performs a sending process and a sending MAC process at the physical layer of GbE/10 GbE. Each of the n×n switches 52-1 through 52-m included in the switch device 52 performs a switching process on the basis of switching information included in data outputted from the traffic manager 51b and sends the data to a corresponding destination sending-end interface card.

As has been described in the foregoing, in the memory control device 1 in which packet data is written to the memories 3-1 through 3-n access to which is limited, in which the scheduler 13 exercises QoS control for determining the order of reading, and in which the data is read out from the memories 3-1 through 3-n, the packet data received is disassembled by the certain access unit and is stored in the data FIFO 21, a write request is stored in the write request FIFO 22, and a read request is stored in the read request FIFO 23.

A bank on which a bank constraint is imposed and access to which is prohibited is avoided. A write request is extracted by the access unit from the write request FIFO 22 corresponding to an accessible bank or a read request is extracted by the access unit from the read request FIFO 23 corresponding to an accessible bank. By doing so, write/read access to the memories 3-1 through 3-n is gained.

As a result, a write request or a read request is made for an accessible bank by the access unit. Therefore, unlike the conventional DRAM access control, useless empty access does not occur. Access stop time and empty access at the time of a bank constraint being imposed can be eliminated and the speed of a memory interface can be improved. In addition, efficiency in sending data to or receiving data from one memory increases. Accordingly, an effective data rate can be improved and the number of memories used can be reduced.

The memory control device according to the present invention improves efficiency in writing/reading and the speed of a memory interface.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A memory control device for controlling access to a memory having a plurality of banks in a storage area, the device comprising:
   a packet disassembly section for disassembling received packet data into segments and detecting packet quality information;
   a memory management section having an address management table for managing an address of a storage destination of the plurality of banks, the memory management section being used for managing a state in which the packet data is stored according to the packet quality information; and
   a memory control section including:
      a segment/request information disassembler for disassembling the segments into data by an access unit by which the memory can be written/read and for generating write requests or read requests according to the access unit; and
      a memory access controller for exercising memory access control to write the data to the plurality of banks in response to the write requests or to read out the data from the plurality of banks in response to the read requests,
   wherein the memory access controller avoids banks access to which is prohibited because of bank constraints, extracts write requests or read requests corresponding to accessible banks from the write requests or the read requests generated, and gains write/read access to the memory.

2. The memory control device according to claim 1, wherein the memory access controller including:
- data memories for storing the data after disassembly by the access unit according to bank;
- write request memories for storing the write requests according to bank;
- read request memories for storing the read requests according to bank; and
- a memory selection controller for selecting a write request memory corresponding to a bank to which the data is to be written and extracting a write request from the selected write request memory or for selecting a read request memory corresponding to a bank from which the data is to be read out and extracting a read request from the selected read request memory.

3. The memory control device according to claim 2, wherein:
- the memory selection controller includes a memory selector, a write/read switching controller, and a bank wait controller;
- the write/read switching controller sends write instructions to the memory selector at the time of writing the data to a memory and sends read instructions to the memory selector at the time of reading out the data from a memory;
- the bank wait controller recognizes the banks on which the bank constraints are imposed and sends access state signals that indicate which banks are accessible and access to which banks is prohibited to the memory selector according to bank;
- when the memory selector receives the write instructions, the memory selector recognizes banks access to which can be gained now from the access state signals, selects a write request memory in which a write request to which a lowest serial number is given is stored from write request memories corresponding to the accessible banks, extracts the write request from the selected write request memory, and generates a write command and write addresses on the basis of the write request; and
- when the memory selector receives the read instructions, the memory selector recognizes banks access to which can be gained now from the access state signals, selects a read request memory in which a read request to which a lowest serial number is given is stored from read request memories corresponding to the accessible banks, extracts the read request from the selected read request memory, and generates a read command and read addresses on the basis of the read request.

4. The memory control device according to claim 3, wherein the write/read switching controller equalizes write access with read access to the memories by counting a number of times the write command is generated to gain access to the memories and a number of times the read command is generated to gain access to the memories and by performing switching from write access to read access or from read access to write access at the time of each count reaching a prescribed number.

5. The memory control device according to claim 2, wherein:
- the memory selection controller further includes a refresh controller;
- at constant time intervals, the refresh controller sends the memory selector refresh instructions to refresh the memories;
- if the memory selector receives the refresh instructions during write access, then the memory selector puts refresh operation in a wait state until switching from the write access to read access and sends a refresh command to the memories at the time of termination of selection of the write request memory and switching from the write access to the read access; and
- if the memory selector receives the refresh instructions during read access, then the memory selector puts refresh operation in a wait state until switching from the read access to write access and sends a refresh command to the memories at the time of termination of selection of the read request memory and switching from the read access to the write access.

6. The memory control device according to claim 1, wherein:
- the memory control section further includes a segment assembler including a holding memory having a storage area divided according to serial number for storing and holding data which reaches and which is read out from the memories, the segment assembler being used for rearranging/assembling the data read out from the memories and outputting the segments;
- the segment/request information disassembler sends the segment assembler disassembly information including items of a request ID given according to segment, a number of pieces of data obtained by disassembling each segment by the access unit, and a leading serial number given to a leading piece of data of the pieces of data obtained by disassembling each segment by the access unit; and
- the segment assembler stores the data which reaches and which is read out from the memories in areas of the holding memory serial numbers of which are the same as serial numbers given to the data which is read out from the memories, recognizes a number of pieces of data which are read out from the memories and which make up one segment and a piece of data located at the head of the segment on the basis of the disassembly information and waits for storage of all of the data read out from the memories in the holding memory according to segment, and outputs the segments in order of the request ID after storage of all pieces of data that are read out from the memories and that make up one segment in the holding memory.

7. The memory control device according to claim 1, wherein:
- the address management table includes segment table information stored in a plurality of queues corresponding to different pieces of packet quality information;
- the segment table information includes items of a memory number/bank number in which data included in a segment is stored, an address of a memory area corresponding to the memory number/bank number, segment length, and a segment type which indicates that the segment is a leading segment, an intermediate segment, or a last segment in the packet data;
- the memory management section generates write request information and read request information each including the memory number/bank number, the address, the segment length, and a request ID given according to segment from the segment table information and sends the write request information and the read request information to the segment/request information disassembler; and
- the segment/request information disassembler generates the write request including an address of data to be written and a serial number given to the data to be written on the basis of the write request information and generates the read request including an address of data to be read out and a serial number given to the data to be read out on the basis of the read request information.

* * * * *